United States Patent
Cormode et al.

(10) Patent No.: US 8,775,362 B2
(45) Date of Patent: *Jul. 8, 2014

(54) METHODS AND APPARATUS TO CONSTRUCT HISTOGRAM AND WAVELET SYNOPSES FOR PROBABILISTIC DATA

(71) Applicant: AT&T Intellectual Property I, L.P., Atlanta, GA (US)

(72) Inventors: Graham Cormode, Summit, NJ (US); Minos Garofalakis, Chania-Crete (GR)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/776,136

(22) Filed: Feb. 25, 2013

(65) Prior Publication Data

US 2013/0173525 A1 Jul. 4, 2013

Related U.S. Application Data

(63) Continuation of application No. 12/334,264, filed on Dec. 12, 2008, now Pat. No. 8,386,412.

(51) Int. Cl.
*G06N 5/04* (2006.01)
*G06F 9/44* (2006.01)
*G06N 7/02* (2006.01)
*G06N 7/06* (2006.01)

(52) U.S. Cl.
CPC .. *G06N 5/04* (2013.01); *G06F 9/44* (2013.01); *G06N 7/02* (2013.01); *G06N 7/06* (2013.01)
USPC ......................................................... 706/52

(58) Field of Classification Search
CPC ....... G06N 5/048; G06N 5/04; G06N 99/005; G06N 7/005; G06Q 10/10
USPC ......................................... 706/52, 46, 45, 62
See application file for complete search history.

(56) References Cited

U.S. PATENT DOCUMENTS

| | | | |
|---|---|---|---|
| 6,052,689 | A | 4/2000 | Muthukrishnan et al. |
| 6,215,907 | B1 * | 4/2001 | Kumar et al. ................. 382/240 |
| 6,460,045 | B1 | 10/2002 | Aboulnaga et al. |
| 6,714,938 | B1 | 3/2004 | Avadhanam et al. |
| 6,760,724 | B1 | 7/2004 | Chakrabarti et al. |

(Continued)

OTHER PUBLICATIONS

Chen et al, "Dynamic Nonuniform Data Approximation in Databases with Haar Wavelet", Journal of Computers, vol. 2, No. 8, Oct. 2007.*

(Continued)

*Primary Examiner* — Lut Wong
*Assistant Examiner* — Ilya Traktovenko
(74) *Attorney, Agent, or Firm* — Hanley, Flight and Zimmerman, LLC

(57) ABSTRACT

A disclosed example method involves generating a plurality of wavelet coefficient quantities. Each wavelet coefficient quantity is generated based on items represented by probabilistic data. Each wavelet coefficient quantity represents different ones of the items by multiplying corresponding wavelet vectors. The example method also involves determining an error measure associated with each of the plurality of wavelet coefficient quantities, and selecting at least one of the plurality of wavelet coefficient quantities based on its associated error measure. The method also involves displaying parameter information associated with the one of the plurality of wavelet coefficient quantities to represent the probabilistic data.

20 Claims, 9 Drawing Sheets

(56) References Cited

U.S. PATENT DOCUMENTS

| | | | |
|---|---|---|---|
| 6,959,304 | B1 | 10/2005 | Teig et al. |
| 7,177,282 | B1 | 2/2007 | Gilbert et al. |
| 7,249,136 | B1 | 7/2007 | Muthukrishnan et al. |
| 7,272,599 | B1 | 9/2007 | Gilbert et al. |
| 7,296,014 | B1 | 11/2007 | Gilbert et al. |
| 2008/0114502 | A1* | 5/2008 | Breed et al. .............. 701/2 |

OTHER PUBLICATIONS

Graps, "An Introduction to Wavelets", The original version of this work appears in IEEE Computational Science and Engineering, Summer 1995, vol. 2, No. 2, published by the IEEE Computer Society.*

Mazurek, "Jamming Protection of Spread Spectrum RFID System", Photonics Applications in Astronomy, Communications, Industry, and High-Energy Physics Experiments 2006, Proc. of SPIE vol. 6347, 634721.*

Chen et al, "Nonuniform Compression in Databases with Haar Wavelet", 2007 Data Compression Conference (DCC'07), 2007 IEEE.*

Deligiannakis, "Accurate Data Approximation in Constrained Environments", 2005.*

Faichney et al, "Video Coding for Mobile Handheld Conferencing", Proceedings of the IASTED International Conference Internet and Multimedia Systems and Applications (IMSA'99) Oct. 18-21, 1999.*

Gormish, "Icon Based Error Concealment for JPEG and JPEG 2000 Images", Published in the 2003 International Conference on Image Processing (ICIP 2003), scheduled for Sep. 14-17, 2003 in Barcelona, Spain.*

Karras, "Data Structures and Algorithms for Data Representation in Constrained Environments", May 2007.*

Karras et al, "The Haar+ Tree: a Refined Synopsis Data Structure", IEEE 23rd International Conference on Data Engineering, 2007. ICDE 2007, Date of Conference: Apr. 15-20, 2007, pp. 436-445.*

Karras et al, "One-Pass Wavelet Synopses for Maximum-Error Metrics", Proceedings of the 31st VLDB Conference, Trondheim, Norway, 2005.*

Misiti et al, "Wavelet Toolbox for Use with MATLAB", Printing History: Mar. 1996 First printing.*

Rane et al, "Wavelet-Domain Reconstruction of Lost Blocks in Wireless Image Transmission and Packet-Switched Networks", 2002 International Conference on Image Processing Proceedings, Feb. 2002: t.1-309-1-312 vol. 1, DOI.10. 1109/ICIP.2002.1038021 ISBN 0-7803-7622-6, vol. 1, 2002.*

Selesnick, "Wavelet Transforms—A Quick Study", Sep. 27, 2007.*

Guha et al., "REHIST; Relative Error Histogram Construction Algorithms" VLDB, Proceedings of the 30th VLDB Conference, Toronto, Canada, 2004, 12 pages, [retrieved from http://www.vldb.org/conf/2004/RS8P2.PDF].

Matias et al., "Wavelet-Based Histograms for Selectivity Estimation," International Conference on management Data: Proceedings of the 1998 ACM SIGMOD international conference on Management of data, 1998, pp. 1-12.

Singh et al., "Data Base Support for Probabilistic Attributes and Tuples," Data Engineering, 2008, ICDE 2008, IEEE 24th International Conference, Cancun, Mexico, Apr. 7-12, 2008, 9 pages.

Neumann et al., "Smooth Interpolating Histograms with Error Guarantees," Lecture Notes in Computer Science; vol. 5071: Proceedings of the 25th British national conference on Databases: Sharing Data, Information and Knowledge, Jul. 7-10, 2008, pp. 126-138.

Reiss et al., "Compact Histograms for Hierarchical Indentifiers," VLDB 2006, Seoul, South Korea, [retrieved from Internet http://aitrc.kaist.ac.kr/~vldb06/slides/r24-3.ppt] (36 Pages).

Christen et al., "Parallel Computing Techniques for High-Performance Probabilistic record Linkage," Symposium on Health Data Linkage, 2002, (11 Pages).

Cormode et al., "Histomgrams and Wavelets on Probabilistic Data," Jun. 5, 2008, [retrieved from Internet http://arxiv.org/PS_cache/arxiv/pdf/0806/0806.1071v1.pdf] (24 Pages).

Singh et al., "Orion 2.0: Native Support for Uncertain Data," Proceedings of the 2008 ACM SIGMOD International Conference on Management of Data, Vancouver, BC, Canada, Jun. 9-12, 2008, 3 pages.

Baltrunas et al., "Multi-Dimensional Histograms with Tight Bounds for the Error," Database Engineering and Applications Symposium, 2006, IDEAS '06, 10th International, (7 pages).

Shim, Kyuseok and Guha, Sudipto, "A Note on Linear Time Algorithms for Maximum Error Histograms," IEEE Transactions on Knowledge and Data Engineering, vol. 19, Issue 7, Jul. 2007, pp. 993-997.

Cho, Byung Kyu, "Spatial Selectivity Estimation Using Cumulative Density Wavelet Histogram," Third International Conference on Intelligent Computing, Lecture Notes in Artificial Intelligence, Aug. 14-21, 2007, vol. 4682, [retrieved from internet http://www.springerlink.com/content/2384j2358454ukmh/], pp. 493-504.

Chi et al., "Spatial Selectivity Estimation Using Compressed Histogram Information," Lecture Notes in Computer Science, 2005, vol. 3399, [retrieved from internet http://www.springerlink.com/content/gnpj6ffumacmmynx/] (6 pages).

Raykar et al., "Fast Computation of Sums of Gaussians in High Dimensions," CS-TR-4767/UMIACS-TR-2005-69, Nov. 4, 2005 (pp. 1-38).

Guha et al., "A Note on Linear Time Algorithms for Maximum Error Histograms," University of Pennsylvania, Departmental Papers (CIS) Department of Computer & Information Science, Jul. 1, 2007 (6 pages).

Deligiannakis et al., "Probabilistic Wavelet Synopses for Multiple Measures," Dec. 9, 2004 (pp. 1-32).

Garofalakis et al., "Wavelet Synopses for General Error Metrics," ACM Transactions on Database Systems, vol. 30, No. 4, Dec. 2005 (pp. 888-928).

Guha, Sudipto, "Space Efficiency in Synopsis Construction Algorithms," Proceedings of the 31st VLDB Conference, Trondheim, Norway, 2005 (pp. 409-420).

Lambert et al., "Efficient On-Line Nonparametric Kernel Density Estimation," Algorithmica, 1999 (pp. 37-57).

Su et al.,"Continuous Kernel-Based Outlier Detection over Distributed Data Streams," in Frontiers of High Performance Computing and Networking ISPA 2007 Workshops, Niagara Falls, Canada, Aug. 28-Sep. 1, 2007, Proceedings, vol. 4743 of Lecture Notes in Computer Science, Springer, 2007 (pp. 305-314).

Dalvi et al., "Efficient Query Evaluation on Probabilistic Databases," Proceedings of the 30th VLDB Conference, Toronto, Canada, 2004, 12 pages.

Khoussainova et al., "Towards Correcting Input Data Errors Probabilistically Using Integrity Constraints," MobiDE'06, Chicago, Illinois, Jun. 25, 2006, 8 pages.

Antova et al., "Fast and Simple Relational Processing of Uncertain Data," IEEE ICDE, Apr. 7-12, 2008, 10 pages.

Benjelloun et al., "An Introduction to ULDBs and the Trio System," IEEE Data Engineering Bulletin, vol. 29, No. 1, Mar. 2006, pp. 1-12.

Boulos et al., "MYSTIQ: A system for finding more answers by using probabilities," SIGMOD, Baltimore, Maryland, Jun. 14-16, 2005, 3 pages.

Garofalakis et al., "Approximate Query Processing: Taming the TeraBytes," VLDB, 2001, pp. 169-212.

Yannis Ioannidis, "The History of Histograms (abridged)," Proceedings of the 29th VLDB Conference, Berlin, Germany, 2003, 12 pages.

Chakrabarti et al., "Approximate Query Processing Using Wavelets," Proceedings of the 26th VLDB Conference, Cairo, Egypt, 2000, pp. 111-122.

Ioannidis et al., "Balancing Histogram Optimality and Practicality for Query Result Size Estimation," SIGMOD'95, San Jose, California, 1995, pp. 233-244.

Suciu et al., "Foundations of Probabilistic Answers to Queries," SIGMOD, Baltimore, Maryland, Jun. 14-16, 2005, p. 963.

Dalvi et al., "Management of Probabilistic Data Foundations and Challenges," PODS'07, Beijing, China, Jun. 11-13, 2007, pp. 1-12.

Jampani et al., "MCDB: A Monte Carlo Approach to Managing Uncertain Data," SIGMOD'08, Vancouver, BC, Canada, Jun. 9-12, 2008, pp. 687-700.

(56) References Cited

OTHER PUBLICATIONS

Cormode et al., "Sketching Probabilistic Data Streams," SIGMOD'07, Beijing, China, Jun. 11-14, 2007, 12 pages.

Jayram et al., "Efficient Aggregation Algorithms for Probabilistic Data," ACM-SIAM SODA, Jan. 7-9, 2007, 10 pages.

Jayram et al., "Estimating Statistical Aggregates on Probabilistic Data Streams," PODS'07, Beijing, China, Jun. 11-13, 2007, pp. 243-252.

Cormode et al., "Approximation Algorithms for Clustering Uncertain Data," PODS'08, Vancouver, BC, Canada, Jun. 9-12, 2008, 9 pages.

Zhang et al., "Finding Frequent Items in Probabilistic Data," SIGMOD'08, Vancouver, BC, Canada, Jun. 9-12, 2008, 13 pages.

Xuan Zheng, "Topics in Massive Data Summarization," Ph.D. dissertation, University of Michigan, Aug. 2008, 96 pages.

Jagadish et al., "Optimal Histogram with Quality Guarantees," Proceedings of the 24th VLDB Conference, New York, 1998, pp. 275-286.

Garofalakis et al., "Probabilistic Wavelet Synopses," ACM Transactions on Database Systems, vol. 29, No. 1, Mar. 2004, pp. 43-90.

Guha et al., "Wavelet Synopsis for Data Streams: Minimizing Non-Euclidean Error," KDD'05, Chicago, Illinois, Aug. 21-24, 2005, 10 pages.

Vitter et al., "Approximate Computation of Multidimensional Aggregates of Sparse Data Using Wavelets," ACM SIGMOD, 1999, 12 pages.

Guha et al., "Data-Streams and Histograms," STOC'01, Hersonissos, Crete, Greece, Jul. 6-8, 2001, 5 pages.

Guha et al., "Approximation and Streaming Algorithms for Histogram Construction Problems," ACM Transactions on Database Systems, vol. 31, No. 1, Mar. 2006, pp. 396-438.

* cited by examiner

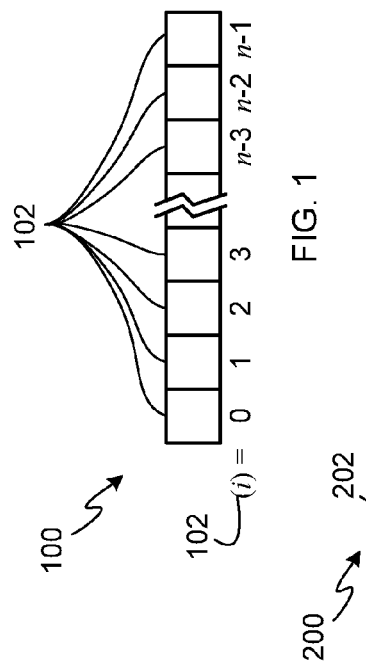

METHODS AND APPARATUS TO CONSTRUCT HISTOGRAM AND WAVELET SYNOPSES FOR PROBABILISTIC DATA

PRIORITY APPLICATION

This is a continuation of U.S. patent application Ser. No. 12/334,264, filed Dec. 12, 2008, which is hereby incorporated herein by reference in its entirety.

FIELD OF THE DISCLOSURE

The present disclosure relates generally to communication systems and, more particularly, to methods and apparatus to construct histogram and wavelet synopses for probabilistic data.

BACKGROUND

Modern real-world applications generate large amounts of data that is often uncertain and imprecise. For instance, data integration and record linkage tools can produce distinct degrees of confidence for output data tuples (based on the quality of the match for the underlying entities). Similarly, pervasive multi-sensor computing applications need to routinely handle noisy sensor readings. Some research efforts on probabilistic data management aim to incorporate uncertainty and probabilistic information as "first-class citizens" of a database system. As in conventional database systems, query processing techniques associated with deterministic data rely on effective data reduction methods that can effectively compress large amounts of deterministic data down to concise data synopses while retaining key statistical traits of the original data collection.

BRIEF DESCRIPTION OF THE DRAWINGS

FIG. 1 illustrates an example probabilistic data domain.

FIG. 2 illustrates an example data structure that stores probabilities associated with different possible worlds and derived using a basic probability density function model.

FIG. 3 illustrates an example data structure that stores probabilities associated with different possible worlds and derived using a tuple probability density function model.

FIG. 4 illustrates an example data structure that stores probabilities associated with different possible worlds and derived using a value probability density function model.

DETAILED DESCRIPTION

Figure 5:
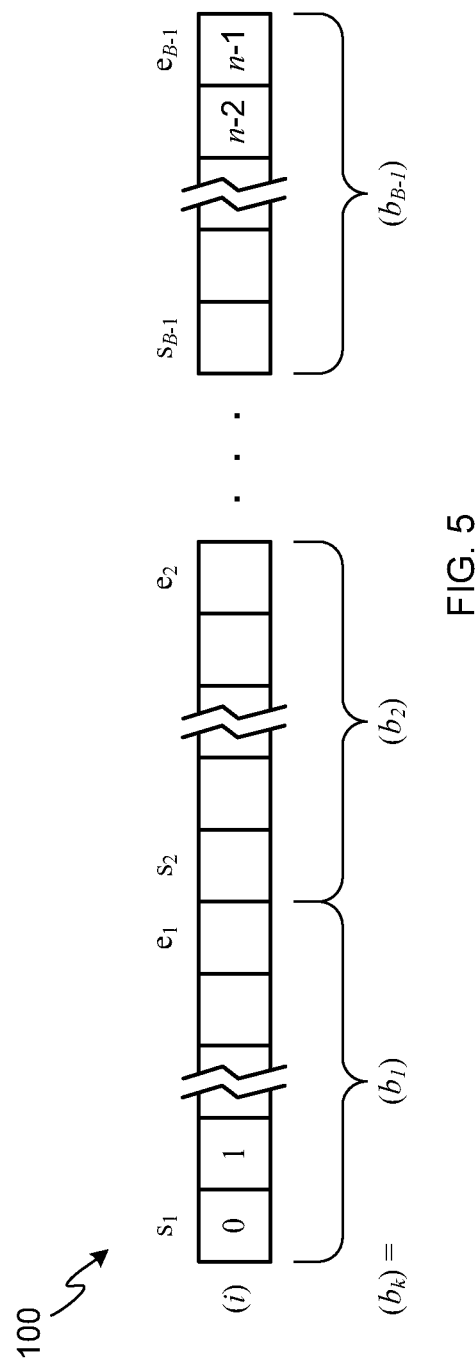
FIG. 5 illustrates the probabilistic data domain of FIG. 1 partitioned into a plurality of buckets having respective bucket boundaries.

The example methods and apparatus described herein may be used to construct histogram and wavelet synopses for probabilistic data. Example methods described herein involve receiving data associated with probability measures and generating a plurality of histograms. In particular, each histogram is generated for a first quantity of items represented by the data and each histogram is generated using a lesser quantity of buckets containing different ones of the first quantity of items. In addition, the example methods involve determining an error measure associated with each of the plurality of histograms. Each error measure is indicative of at least one error deviation between any particular item in a particular bucket of a respective histogram and a synopsis describing that bucket and the items in that bucket. The method further involves selecting one of the plurality of histograms based on its associated error measure.

As the ubiquity of databases increases and extends to many different types of data, the effect of uncertain information on database management also increases. That is, while some database uses involve information having a significantly high degree of certainty as to its accuracy or truthfulness (i.e., deterministic data), other database applications involve managing data having uncertainties as to the information it represents (i.e., probabilistic data). For example, deterministic data may include ages and birthplaces of a population taken from birth records having a significantly high likelihood of complete accuracy. However, probabilistic data may include ages and birthplaces inferred about a population based on ages and birthplaces known of a relatively smaller sample of people within that population. As such, managing deterministic data in databases using known techniques can produce searchable contexts that deliver accurate and relevant results. However, using the same known techniques for managing databases that store probabilistic data having associated uncertainties can deliver search results that are relatively less relevant or not relevant and/or omit data that is relatively more relevant.

Other real-world applications that can generate massive amounts of probabilistic data that is uncertain and imprecise include, for example, data integration and record linkage tools. Such applications can produce distinct degrees of confidence for output data tuples based on, for example, the quality of the match for the underlying entities. In addition, multi-sensor computing applications often generate and analyze large amounts of noisy sensor measurements (e.g., readings associated with radio frequency identification (RFID) tags).

The example methods and apparatus described herein can be used to implement data reduction techniques that can produce concise, accurate synopses of large probabilistic relations between data including uncertain information. Similar to their deterministic relation counterparts (i.e., relatively high-certainty data), such compact probabilistic data synopses can form the foundation for human understanding and interactive data exploration (e.g., searching, data mining, data management, etc.), probabilistic query planning and optimization, and fast approximate query processing in probabilistic database systems.

As discussed below, the example methods and apparatus can be used to build histogram-based and Haar wavelet-based synopses on probabilistic data (i.e., data associated with probability measures as to the certainty of its accuracy). To generate these synopses, a set or group of histogram bucket boundaries or wavelet coefficients are selected to optimize the accuracy of the approximate representation of a collection of probabilistic tuples under a particular error metric. For example, for each of a plurality of different error metrics discussed below, the example methods and apparatus can be used to construct optimal or near optimal size-B histogram and size-C wavelet synopses. The histogram or wavelet synopses are constructed or selected by analyzing the structures of the probability distributions and using dynamic programming-based techniques typically used in connection with deterministic domain data.

To generate histogram synopses, the example methods and apparatus described herein divide or separate input probabilistic data into "buckets" so that all tuples falling in the same bucket have similar behavior. Bucket boundaries are selected to minimize a given error function or error metric that measures a within-bucket dissimilarity. In addition, the example methods and apparatus described herein can also generate wavelet synopses to represent probabilistic data by choosing a small number of wavelet basis functions which best describe the data, and contain as much of the "expected energy" of the data as possible. Thus, for both histograms and wavelets, the synopses are generated to capture and describe the probabilistic data as accurately as possible given a fixed size for each synopsis. These synopses can be used to compactly show users the key components of probabilistic data. In addition, the synopses can also be used in approximate query answering and query planning. In some example implementations, by finding approximate representation summaries (i.e., the histogram and wavelet synopses) that compactly represent a much larger probabilistic data set, such summaries can be used to evaluate queries and provide approximate answers or approximate results relatively more quickly than finding exact answers.

As discussed in detail below, constructing histogram and wavelet synopses over probabilistic data involves using a probabilistic data reduction problem over a variety of cumulative and/or maximum error objectives (i.e., target error values) (which can be measured using any of a variety of different error metrics). The probabilistic data reduction problem is based on natural generalizations of histograms and wavelets from deterministic to probabilistic data. The example methods and apparatus described herein can be used to find optimal histograms for probabilistic data under common cumulative error objectives (e.g., sum-squared error and sum-relative error) and/or corresponding maximum error objectives. In addition, fast approximate solutions can be implemented. Each error metric or error objective is analyzed in turn, and the cost of a given bucket, along with its optimal representative value, can be found from corresponding pre-computed arrays, taking into account the distributions of items (i.e., items of a probabilistic data grouping), and correlations between them. To construct wavelets for probabilistic data, the example methods and apparatus can be implemented to use the core sum-squared error (SSE) objective. In particular, a wavelet transformation can be computed of a deterministic input derived from the probabilistic input data.

Before describing the methods and apparatus to construct histogram and wavelet synopses for probabilistic data, different probabilistic data models and their components are first described. Referring to FIG. 1, a basic representation of a probabilistic data domain 100 is shown as having a plurality of data items (i) 102 (i.e., an index set). In the illustrated example, the data domain 100 is n-items wide, and each of the data items (i) includes a respective value. In some instances, two or more items (i) may have equal values. In the illustrated example, the data items (i) represent probabilistic data. Each item (i) can be processed as individual data to generate histogram and wavelet synopses. Alternatively, the data domain 100 can be partitioned into tuples ($t_j$) having one or more of the items (i), and the tuples ($t_j$) can be used to generate histogram and wavelet synopses.

Different models of probabilistic data capture various levels of independence between the individual data values described (i.e., the data items (i)). Each model can be used to describe a distribution over different possible worlds (W). Each possible world (W) is a relation containing some number of tuples ($t_j$). The most general one of the probabilistic models (i.e., the complete model) describes the complete correlations between all tuples ($t_j$). That is, the complete model describes every possible world (W) and its associated probability explicitly. However, the size of such a model for even a moderate number of tuples ($t_j$) is significantly large, since the exponentially many possible combinations of values are explicitly represented. In practice, finding the (exponentially many) parameters for the fully general, complete model is typically unfeasible. Instead, more compact models are adopted which can reduce the number of parameters by making independence assumptions between tuples ($t_j$).

Three probabilistic data models described below include a basic model, a tuple probability density function (pdf) model, and a value pdf model. The example methods and apparatus described herein can be configured to use tuple pdf and/or the value pdf to determine whether particular synopses satisfy predetermined amounts of error (e.g., target error values or error objectives) for different probability data sets while using an optimal or near-optimal quantity of buckets.

The basic model includes a set of (m) tuples ($t_j$) where the j-th tuple includes an item-probability pair $\langle t_j, p_j \rangle$, in which the tuple ($t_j$) is an item (e.g., one of the data items (i) 102 of FIG. 1) drawn from a fixed domain, and ($p_j$) is the probability that ($t_j$) appears in any possible world (W). Each possible world (W) is formed by including a subset of the items ($t_j$). In the basic model, each tuple ($t_j$) is assumed to be independent of all others, and the probability of a possible world (W) is given by equation 1 below.

$$Pr[W] = \Pi_{j \in W} p_j \Pi_{j \notin W}(1-p_j) \qquad \text{Equation 1}$$

In equation 1 above, the nomenclature j∈W indicates that the tuple ($t_j$) is present in the possible world (W), and the nomenclature j∉W indicates that the tuple ($t_j$) is not present in the possible world (W). Each tuple ($t_j$) can be somewhat complex (e.g., a row in a table), but for purposes of describing the example methods and apparatus herein and without loss of generality, each tuple ($t_j$) can be treated as a relatively simple object. In particular, each tuple ($t_j$) can be drawn from a fixed, ordered domain of items (i) of size (n) (e.g., the n-size probabilistic data domain 100 of FIG. 1 having data items i=0, 1, 2, 3, . . . , n−1). In the illustrated examples described herein, occurrences of each item (i) value can correspond to one or more different tuples ($t_j$).

All of the models described herein (i.e., the basic pdf model, the tuple pdf model, the value pdf model, and the complete model) describe the input data (e.g., the input data 100 of FIG. 1) to the summarization process. The complete model can describe all possible correlations, while the basic pdf model, the tuple pdf model, and the value pdf model are more restricted in what sets of possible worlds (W) they can describe. The relatively simplest model is the basic pdf model, which is a special case of both the tuple pdf model and the value pdf model. The tuple pdf model and the value pdf model both describe instances that can also be described using the complete model. FIGS. 2-4 discussed below are example manners in which each of the basic pdf model, the tuple pdf model, and the value pdf model can be used to describe the input data 100 in terms of a respective complete model. In particular, while all of the models can be used for summarization by histograms and/or wavelets, due to the typically large amount of input data, a compact histogram (or wavelet) (with a smaller description than the input size) is preferable to work with. Thus, the basic pdf model, the tuple pdf model, and the value pdf model can be used while still generating input data descriptions for the summarization process that are substantially similar to descriptions that could otherwise be generated using the more complex complete model.

In the tuple pdf model, instead of a single item-probability pair $\langle t_j, p_j \rangle$, a probabilistic data domain (e.g., the data domain 100) is expressed as a set of pairs of mutually exclusive possible tuple values with probabilities summing to at most 1 (i.e., Pr≤1). That is, the input probabilistic data consists of a sequence of tuples $t_j \in T$ of the form $<(t_{j1}, p_{j1}), \ldots, (t_{jl}, p_{jl})>$. Each tuple ($t_j$) can specify a set of mutually exclusive possible values for the i-th row of a relation. The sum of the probabilities ($p_j$) within a tuple ($t_j$) is less than or equal to one. If the sum of the probabilities ($p_j$) is less than one for any tuple ($t_j$), the remaining probability measure is indicative of the chance that there is no corresponding item for a particular item value within that tuple ($t_j$). In the example implementations described herein, the sum of the probabilities ($p_j$) for any tuple ($t_j$) is regarded as a discrete pdf for the j-th item (i) in the input probabilistic data (e.g., $\Pr[t_j=t_{j1}]=p_{j1}$, $\Pr[t_j=t_{j2}]=p_{j2}$, etc.). In addition, each tuple ($t_j$) is assumed to be independent of all other tuples of the data domain, so the probability of any possible world [W] can be computed via multiplication of the relevant probabilities ($p_j$).

The tuple pdf model can be used for several applications including applications in which an observer takes readings and has some uncertainty over what was observed. Another application is when an observer takes readings of a known article or object (e.g., readings generated by a sensor making discrete measurements), but has uncertainty over a value or frequency associated with the article or object.

The value pdf model consists of a sequence of frequency tuples ($f_i$) of the form $<i: (f_{i1}, p_{i1}) \ldots (f_{il}, p_{il})>$, where the probabilities ($p_i$) in each frequency tuple ($f_i$) sum to less than or equal to one. Each tuple ($f_i$) specifies the distribution of frequencies of a separate item (i). The distributions of different items (i) are assumed to be distinct. The value pdf model describes a discrete pdf for the random variable ($g_i$) in connection with, for example, a distribution of frequencies of the i-th item (e.g., $\Pr[g_i=f_{i1}]=p_{i1}$, $\Pr[g_{i1}=f_{i2}]=p_{i2}$, etc.). The probability ($p_i$) associated with the random variable ($g_i$) is independent and, thus, the probability ($p_i$) of any possible world (W) can be computed via multiplication of probabilities ($p_i$) for the frequency ($f_i$) of each item in turn. If probabilities in a tuple ($f_i$) sum to less than one, the remainder is taken to implicitly specify the probability that the frequency is zero, by analogy with the basic model. Expressing a domain of frequency tuples ($f_i$) as (V), the expression f∈V indicates that the frequency-probability pair (f, p) is present in the domain (V).

For both the basic and tuple pdf models, the frequency of any given item (i) within a possible world (W) is a non-negative integer, and each occurrence of that item (i) corresponds to a tuple from the input probabilistic data (e.g., the probabilistic data 100 of FIG. 1). The value pdf model can specify arbitrary fractional frequencies, but the number of such frequencies is bounded by the size of the input, m. The input probabilistic data in the tuple pdf model induces a distribution over frequencies ($f_i$) of each item (i). We define the induced value pdf which provides $\Pr[g_i=v]$ for some v∈V and for each item (i). Unlike in the value pdf model, these induced pdfs are not independent. However, the representation that $\Pr[g_i=v]$ for some v∈V can be used in connection with the example methods and apparatus described herein to identify an optimal or near optimal bucket quantity based on a particular error metric. For data presented in the tuple pdf format, building the induced value pdf for each value inductively takes time O(|V|) to update the partial value pdf with each new tuple and requires a total memory storage capacity O(m). The 'O' notation is used herein to describe an asymptotic cost such that O($f$(x)) indicates the dependence of a procedure or space as a function of x, ignoring constants of proportionality.

FIGS. 2-4 illustrate probabilities associated with the presence of items in possible worlds as computed using the basic model, the tuple pdf model, and the value pdf model described above. In FIGS. 2-4, W' denotes the space of all possible worlds, and Pr[W] denotes the probability associated with the possible world (W) being present in the space of all possible worlds (W') (i.e., W∈W'). Equation 2 below can be used to compute the expectation ($E_W$) of various quantities over different possible worlds (W) given a function ($f$) that can be evaluated on a possible world (W).

$$E_W[f] = \sum_{W \in W'} Pr(W)f(W) \qquad \text{Equation 2}$$

Turning to FIG. 2, an example basic model probabilities table 200 includes a possible worlds (W) row 202 and a probabilities (Pr[W]) row 204. For an ordered domain containing three items ($t_j$) one, two, and three (i.e., $t_j$=1, 2, and 3), the possible worlds (W) row 202 identifies different possible worlds (W) in which these items ($t_j$=1, 2, and 3) may or may not be present in accordance with the basic model described above. In the illustrated example of FIG. 2, the input probabilistic data $$\left\langle 1, \frac{1}{2} \right\rangle, \left\langle 2, \frac{1}{3} \right\rangle, \left\langle 2, \frac{1}{4} \right\rangle, \left\langle 3, \frac{1}{2} \right\rangle$$

in the basic model leads to the twelve possible worlds shown in the possible worlds (W) row 202. Each datum of the input probabilistic data represents an item-probability pair $\langle t_j, p_j \rangle$ indicating the probability ($p_j$) that the value of that item ($t_j$) appears in any possible world. Due to the probabilistic independence of the basic model, the presence of any item ($t_j$) represented by the item-probability pairs $\langle t_j, p_j \rangle$ in any possible world is independent of the probability of the appearance of any other item ($t_j$) in those possible worlds. For example, the first item-probability pair $$\left\langle 1, \frac{1}{2} \right\rangle$$

indicates that the first item ($t_j=1$) has a one-half probability ($p_j=\frac{1}{2}$) of appearing in any possible world derived from the input probabilistic data. The second item-probability pair $$\left\langle 2, \frac{1}{3} \right\rangle$$

indicates that the second item ($t_j=2$) has a one-third probability ($p_j=\frac{1}{3}$) of appearing in any possible world. The third item-probability pair $$\left\langle 2, \frac{1}{4} \right\rangle$$

indicates that according to another measure or observation of the second item ($t_j=2$) it has a one-quarter probability ($p_j=\frac{1}{4}$) of appearing in any possible world. The possible world probabilities (Pr[W]) of the probabilities (Pr[W]) row 204 can be determined by processing the input probabilistic data $$\left\langle 1, \frac{1}{2} \right\rangle, \left\langle 2, \frac{1}{3} \right\rangle, \left\langle 2, \frac{1}{4} \right\rangle, \left\langle 3, \frac{1}{2} \right\rangle$$

using equation 1 described above.

Turning to FIG. 3, an example tuple pdf model probabilities table 300 includes a possible worlds (W) row 302 and a probabilities (Pr[W]) row 304. For an ordered domain containing three items ($t_j$) one, two, and three (i.e., $t_j=1, 2,$ and 3), the possible worlds (W) row 302 identifies different possible worlds (W) in which these items ($t_j=1, 2,$ and 3) may or may not be present in accordance with the tuple pdf model described above. In the illustrated example of FIG. 3, the input probabilistic data $$\left\langle \left(1, \frac{1}{2}\right), \left(2, \frac{1}{3}\right) \right\rangle, \left\langle \left(2, \frac{1}{4}\right), \left(3, \frac{1}{2}\right) \right\rangle$$

in the tuple pdf model leads to the eight possible worlds of the possible worlds (W) row 302. This input probabilistic data includes a first tuple $$\left\langle \left(1, \frac{1}{2}\right), \left(2, \frac{1}{3}\right) \right\rangle$$

and a second tuple $$\left\langle \left(2, \frac{1}{4}\right), \left(3, \frac{1}{2}\right) \right\rangle.$$

As discussed above, the probabilistic sum of each tuple is less than or equal to one and, if less than one, the remaining probability is the probability that there is no corresponding item. Due to the probabilistic dependence within each tuple in the tuple pdf model, the presence of any item ($t_j$) represented by each item-probability pair $\langle t_j, p_j \rangle$ in any possible world is dependent on the probability of the appearance of any other item ($t_j$) within the same tuple. For example, the first tuple $$\left\langle \left(1, \frac{1}{2}\right), \left(2, \frac{1}{3}\right) \right\rangle$$

indicates that the first item ($t_j=1$) has a one-half probability of appearing in any possible world and that the second item ($t_j=2$) has a one-third probability of appearing in any possible world but that the probability of the second item appearing is dependent on the appearance of the first item ($t_j=2$).

Turning to FIG. 4, an example value pdf model probabilities table 400 includes a possible worlds (W) row 402 and a probabilities (Pr[W]) row 404. For an ordered domain containing three items ($t_j$) one, two, and three (i.e., $t_j=1, 2,$ and 3), the possible worlds (W) row 402 identifies different possible worlds (W) in which these items ($t_j=1, 2,$ and 3) may or may not be present in accordance with the value pdf model described above. In the illustrated example of FIG. 4, the input probabilistic data $$\left\langle 1 : \left(1, \frac{1}{2}\right) \right\rangle \left\langle 2 : \left(1, \frac{1}{3}\right), \left(2, \frac{1}{4}\right) \right\rangle, \left\langle 3 : \left(1, \frac{1}{2}\right) \right\rangle$$

in the value pdf model leads to the twelve possible worlds of the possible worlds (W) row 402. This input probabilistic data includes a first tuple $$\left\langle 1 : \left(1, \frac{1}{2}\right) \right\rangle,$$

a second tuple $$\left\langle 2 : \left(1, \frac{1}{3}\right), \left(2, \frac{1}{4}\right) \right\rangle,$$

and a third tuple $$\left\langle 3 : \left(1, \frac{1}{2}\right) \right\rangle.$$

As discussed above, the probabilistic sum of each tuple is less than or equal to one and, if less than one, the remaining probability is the probability that there is no corresponding item. Due to the probabilistic dependence within each tuple in the value pdf model, the presence of any item ($t_j$) represented by each item-probability pair $\langle t_j, p_j \rangle$ in any possible world is dependent on the probability of the appearance of any other item ($t_j$) within the same tuple.

The input probabilistic data for the value pdf model defines the following pdfs, which, in turn, define the twelve possible worlds (W) of the possible worlds (W) row 402.

$$Pr[g_1 = 0] = \frac{1}{2}, Pr[g_1 = 1] = \frac{1}{2}$$

$$Pr[g_2 = 0] = \frac{5}{12}, Pr[g_2 = 1] = \frac{1}{3}, Pr[g_2 = 2] = \frac{1}{4}$$

$$Pr[g_3 = 0] = \frac{1}{2}, Pr[g_3 = 1] = \frac{1}{2}$$

The above pdfs show the probabilities that the random variable ($g_i$) for each tuple will be equal to a particular item ($t_j$) for each of the first tuple $$\left\{ 1: \left(1, \frac{1}{2}\right) \right\},$$

the second tuple $$\left\{ 2: \left(1, \frac{1}{3}\right), \left(2, \frac{1}{4}\right) \right\},$$

and the third tuple $$\left\{ 3: \left(1, \frac{1}{2}\right) \right\}.$$

For all of the input probabilistic data described above in connection with the example tables 200, 300, and 400, the expectation ($E_W$) for the random variable of item one ($g_1$) is equal to one-half (i.e., $$E_W[g_1] = \frac{1}{2}).$$

In the value pat case described in connection with the example table 400, the expectation ($E_W$) for the random variable of item two ($g_2$) is equal to five-sixths (i.e., $$E_W[g_2] = \frac{5}{6}),$$

while for the tuple pdf and the basic model, the expectation ($E_W$) for the random variable of item two ($g_2$) is equal to seven-twelfths (i.e., $$E_W[g_2] = \frac{7}{12}).$$

Although two possible worlds (W) may be formed in different ways, they may be indistinguishable. For example, in the basic model example, the second possible world (W={2}) can result either from the second tuple $$\left(2, \frac{1}{3}\right)$$

the third tuple $$\left(2, \frac{1}{4}\right).$$

In the illustrated examples described herein, distinctions are not made between possible worlds (W) based on how they arose and, thus, they are treated as identical. The input probabilistic data is then characterized by parameters n, m, and V. The parameter (n) represents the size of the ordered domain from which the input probabilistic data is drawn. The parameter (m) represents the total number of item-probability pairs $\langle t_j, p_j \rangle$ in the input (thus, the input can be described with O(m) pieces of information). The parameter (V) represents the set of values that the frequencies ($f_i$) take on. Here, the absolute value of the set of frequency values (V) is less than or equal to the total number of item-probability pairs $\langle t_j, p_j \rangle$ (m) (i.e., |V|≤m), but it could be much less. In all three examples described above in connection with FIGS. 2-4, the size of the ordered domain is three (i.e., n=3), the total number of item-probability pairs $\langle t_j, p_j \rangle$ is 4 (i.e., m=4), and the set of frequency values (V) is zero, one, and two (i.e., V={0, 1, 2}).

FIG. 5 illustrates the probabilistic data domain 100 of FIG. 1 partitioned into a plurality of buckets (b). In the illustrated example, the one-dimensional distribution of the data 100 is defined (without loss of generality) over the integer domain [n]={0, . . . , n−1}. For each i∈[n], the random variable ($g_i$) denotes the frequency of the domain value (i) in the underlying data set. The example methods and apparatus described herein can be used to generate a histogram synopsis to provide a concise, piece-wise approximate representation of the distribution of the data 100 based on partitioning the ordered domain [n] into a quantity of B buckets ($b_k$). Each bucket ($b_k$) includes a start point ($s_k$) and an end point ($e_k$) (i.e., the boundaries of each bucket are defined as $b_k=(s_k, e_k)$. In addition, each bucket ($b_k$) approximates the frequencies of the contiguous subsequence of values {$s_k, s_k+1, \ldots, e_k$} (termed the span of the bucket ($b_k$)) using a single representative bucket value ($\hat{b}_k$) (i.e., a synopsis of the data items in that bucket (b)). In the illustrated example, the width of each bucket ($b_k$) (i.e., number of distinct items) is indicated as ($n_k=e_k-s_k+1$). As shown in FIG. 5, the B buckets in a histogram form a partition of the ordered domain [n] such that $s_1=0$, $e_B=n-1$, and $s_k+1=e_k+1$ for all k=1, . . . , B−1.

By using O(B)<<n space to represent an O(n)-size data distribution, histograms provide a very effective means of data reduction, with numerous applications. This data reduction implies approximation errors in the estimation of frequencies, since each $g_i \in b_k$ is estimated as $\hat{g}_i \in \hat{b}_k$. The histogram construction problem is, given a storage budget of B buckets, to build a B-bucket histogram $H_B$ that is optimal or near optimal under some aggregate error metric (e.g., one of the error metrics discussed below).

Example histogram error metrics that can be used in connection with the example methods and apparatus described herein to find optimal or near optimal quantities of B buckets include cumulative error metrics such as the sum-squared-error metric (SSE(H)), the sum-squared-relative-error metric (SSRE(H)), the sum-absolute-error metric (SAE(H)). In addition, example maximum error metrics that may be used include the maximum-absolute-error metric (MAE(H)) and the maximum-absolute-relative-error metric (MARE(H)).

The sum-squared-error metric (SSE(H)) can be expressed as shown below in equation 3.

$$SSE(H) = \sum_{i=1}^{n}(g_i - \hat{g}_i)^2 = \sum_{k=1}^{B}\sum_{i=s_k}^{e_k}(g_i - \hat{b}_k)^2 \quad \text{Equation 3}$$

The sum-squared-error metric (SSE(H)) of equation 3 above defines the class of V-optimal histograms.

The sum-squared-relative-error metric (SSRE(H)) can be expressed as shown below in equation 4.

$$SSRE(H) = \sum_{i=1}^{n} \frac{(g_i - \hat{g}_i)^2}{\max\{c, |g_i|\}^2} \quad \text{Equation 4}$$

In the sum-squared-relative-error (SSRE(H)) metric of equation 4, the constant (c) in the denominator enables substantially reducing or eliminating excessive emphasis from being placed on small frequencies.

The sum-absolute-error (SAE(H)) and the sum-absolute-relative-error (SARE(H)) can be expressed as shown in equations 5 and 6, respectively, and are defined similarly to the sum-squared-error metric (SSE(H)) of equation 3 and the sum-squared-relative-error metric (SSRE(H)) of equation 4, replacing the square with an absolute value.

$$SAE(H) = \sum_{i=1}^{n} |g_i - \hat{g}_i| \quad \text{Equation 5}$$

$$SARE(H) = \sum_{i=1}^{n} \frac{|g_i - \hat{g}_i|}{\max\{c, |g_i|\}} \quad \text{Equation 6}$$

The maximum-absolute-relative-error metric (MARE(H)) can be expressed as shown in equation 7 below. The maximum-absolute-relative-error metric (MARE(H)) is in the class of maximum error metrics, which provide approximation guarantees on the relative/absolute error of individual frequency approximations.

$$MARE(H) = \max_{i \in [n]} \frac{|g_i - \hat{g}_i|}{\max\{c, |g_i|\}} \quad \text{Equation 7}$$

Histogram construction satisfies the principle of optimality. That is, if the B-th bucket in the optimal or near optimal histogram spans the range [i+1, n-1], then the remaining B-1 buckets must form an optimal histogram for the range [0, i]. A dynamic-programming (DP) algorithm can be used to compute the optimal error value OPTH[j, b] for a b-bucket histogram spanning the prefix [1,1] based on the following recurrence of equation 8.

$$OPTH[j, b] = \min_{0 \leq l < j}\left\{h\left(OPTH[l, b-1], \min_{\hat{b}}\{BE([l+1, j], \hat{b})\}\right)\right\} \quad \text{Equation 8}$$

In equation 8 above, BE([x,y],z) denotes the error contribution of a single histogram bucket spanning [x,y] using a representative value of (z) to approximate all enclosed frequencies, and h(x, y) is x+y (respectively, max{x, y}) for cumulative (respectively, maximum) error objectives (i.e., target error values). The example methods and apparatus described herein translate the above recurrence into a fast algorithm by relatively quickly finding the best or near best representative bucket value ($\hat{b}$) and the corresponding optimal error value BE( ) for the single-bucket case.

Given a collection of probabilistic attribute values (e.g., the data domain 100 of FIGS. 1 and 5), a synopsis space budget B, and a target (cumulative or maximum) error metric, the methods and apparatus described herein can be used to determine a size-B synopsis that minimizes either (1) the expected cumulative error over all possible worlds (W) (i.e., $E_W[\Sigma_i \text{err}(g_i, \hat{g}_i)]$) (in the case of a cumulative error objective) or (2) the maximum value of the per-item expected error over all possible worlds (i.e., $\max_i \{E_W[\Sigma_i \text{err}(g_i, \hat{g}_i)]\}$) (for a maximum error objective).

The following describes finding optimal or near optimal histograms using the cumulative error metrics (i.e., the SAE(H), the SARE(H), the SSE(H), and the SSRE(H) metrics) described above, which minimize the expected cost of the histogram. The methods and apparatus described herein are based on applying the dynamic programming (DP) approach to compute the optimal or near optimal representative bucket value ($\hat{b}$) for a bucket (b) under a given error objective, and also to compute the corresponding bucket error (BE) expectation value ($E_W$) of $E_W[BE(b, \hat{b})]$. Computing a bucket error expectation value ($E_W$) of $E_W[BE(b, \hat{b})]$ involves determining a probabilistic expected error for each bucket (b), and the probabilistic expected error is indicative of the quality or accuracy with which each representative bucket value ($\hat{b}$) (e.g., a bucket synopsis) represents the items (i) in a respective or corresponding bucket (b). In the example implementations described herein, each probabilistic expected error (i.e., a bucket error expectation value ($E_W$) of $E_W[BE(b, \hat{b})]$) is indicative of an error deviation between any particular item (i) in a particular bucket (b) and the representative bucket value ($\hat{b}$) describing that bucket (b) and its items (i). In the example methods and apparatus described herein, the principle of optimality holds even under uncertain data. For example, since the expectation ($E_W$) of the sum of costs of each bucket (b) is equal to the sum of the expectations, removing the final bucket leaves an optimal B-1 bucket histogram over the prefix of the domain. Thus, equation 8 above can be used to determine a solution that evaluates $O(Bn^2)$ possibilities. The cost $O(Bn^2)$ is linear with the bucket quantity (B) and quadratic with the input data set size (n).

Turning first to determining histograms using the sum-squared-error metric (SSE(H)), the SSE is the sum of the squared differences between the values within a bucket $b_k$ and the representative value of the bucket ($\hat{b}_k$). For a fixed possible world (W), the optimal value for the representative bucket item value ($\hat{b}_1$) is the mean of the random variable frequencies ($g_i$) in the bucket (b) and the measure reduces to a multiple of the sample variance of the values within the bucket (b). This holds true even for uncertain data (e.g., the data 100 of FIGS. 1 and 5), as shown below. To use the dynamic programming (DP) approach on uncertain data, which specifies exponentially many possible worlds (W), the example methods and apparatus described herein can be used to efficiently or near efficiently compute the variance in a given bucket (b) specified by start point (s) and end point (e) (i.e., $b_k=(s_k, e_k)$).

Given the (fixed) frequency distribution implied by a possible world (W), and bucket (b) of span $n_b$, the sample variance of the possible world (W), $\sigma_b^2(W)$, is defined from $g_i(W)$ (frequency of item i in the possible world (W)) as shown in equation 9 below.

$$\sigma_b^2(W) = \sum_{i=s}^{e} \frac{(g_i - \bar{b})^2}{n_b} = \left(\sum_{i=s}^{e} \frac{g_i^2}{n_b}\right) - \left(\sum_{i=s}^{e} \frac{g_i}{n_b}\right)^2 \quad \text{Equation 9}$$

Given a distribution over the possible world (W) associated with the probability Pr[W], substituting the variance from equation 2 above results in equation 10 below.

$$Var_W(b) = E_w[\sigma_b^2] = \sum_{W \in W'} \sigma_b^2(W) Pr[W] \quad \text{Equation 10}$$

Under the sum-squared-error (SSE(H)) metric, the cost is minimized by setting the representative bucket value ($\hat{b}$) as $\hat{b} = E_w[\Sigma_{i=s}^{e} g_i] = \bar{b}$. This follows algebraically because the cost of the bucket (b) can be shown to be $n_b(Var_W(b) + (\hat{b}-\bar{b})^2)$. Using equations 9 and 10 above, $SSE(b,\bar{b}) = n_b Var_W(b)$ can be written as the combination of two terms as shown in Equation 11 below.

$$SSE(b, \bar{b}) = \sum_{W \in W'} Pr[W] \sum_{i=s}^{e} g_i(W)^2 - \sum_{W \in W'} \frac{Pr[W]}{n_b} \left(\sum_{i=s}^{e} g_i(W)\right)^2$$

$$= \sum_{i=s}^{e} E_W[g_i^2] - \frac{1}{n_b} E_W\left[\left(\sum_{i=s}^{e} g_i\right)^2\right] \quad \text{Equation 11}$$

In equation 11 above, the first term is the expectation over possible worlds ($E_W$) of the sum of squares of frequencies of each item (i) in the bucket (b). The second term is the expected square of the weight of the bucket (b), scaled by the span of the bucket (b). The value pdf model and the tuple pdf model described above can be used to compute each term relatively efficiently.

Using the value pdf model in connection with the SSE error metric, a distribution for each item (i) over frequency values $v_j \in V$ gives $Pr[g_i = v_j]$. The independence of the value pdf model results in equation 12 below.

$$\sum_{i=s}^{e} E_W[g_i^2] = \sum_{i=s}^{e} \sum_{v_j \in V} Pr[g_i = v_j] v_j^2 \quad \text{Equation 12}$$

Since for any random variable X, $E[X^2] = Var[X] + E[X]^2$, by linearity of expectation and summation of variance, the second term in equation 11 can be expressed as shown in equation 13 below.

$$E_W\left[\left(\sum_{i=s}^{e} g_i\right)^2\right] = E_W\left[\sum_{i=s}^{e} g_i\right]^2 + Var_W\left[\sum_{i=s}^{e} g_i\right] \quad \text{Equation 13}$$

$$= \left(\sum_{i=s}^{e} \sum_{v_j \in V} Pr[g_i = v_j] v_j\right)^2 + \sum_{i=s}^{e} Var_W[g_i]$$

The variance of frequency is defined as shown in Equation 14 below.

$$Var_W[g_i] = \sum_{v_j \in V} Pr[g_i = v_j] v_j^2 - \left(\sum_{v_j \in V} Pr[g_i = v_j] v_j\right)^2 \quad \text{Equation 14}$$

Turning now to use of the tuple pdf model in connection with the SSE error metric, there are many more interactions between items in the same tuple. As shown by equation 11 above, the expectation values $E_W[g_i^2]$ and $E_W[(\Sigma_i g_i)^2]$ need to be computed. To do this, let the set of tuples in the input be $T=\{t_j\}$, so that each tuple has an associated pdf giving the probability $Pr[t_j=i]$, from which is derived $Pr[a \leq t_j \leq b]$, which is the probability that the i-th tuple in the input falls between (a) and (b) in the input domain. Under these conditions, the expectation $E_W[g_i^2]$ can be expressed as shown below in equation 15.

$$E_W[g_i^2] = Var_W[g_i] + (E_W[g_i])^2 \quad \text{Equation 15}$$

$$= \sum_{t_j \in i} Pr[t_j = i](1 - Pr[t_j = i]) + \left(\sum_{t_j \in T} Pr[t_j = i]\right)^2$$

In the SSE case under the tuple pdf model, equation 15 above relies on the fact that variance of each frequency ($g_i$) is the sum of the variances arising from each tuple in the input. Observe that although there are dependencies between particular items, such dependencies do not affect the computation of the expectations ($E_W$) for individual items (i). The expectations ($E_W$) for the individual items (i) can be summed to find the overall expectation for all tuples of the input.

For the second term in equation 11 above, the expression of equation 13 above can be used to determine an expression for $(E_W[\Sigma_i g_i])^2$. But one cannot simply write $Var_W[\Sigma_{i=s}^{e} g_i]$ as the sum of variances, because these are no longer independent variables. Thus, instead all items (i) are treated in the same bucket (b) together as a single item, and the expected square of that bucket is computed by iterating over all of the tuples in the input T using equation 16 below.

$$Var_W[\Sigma_{i=s}^{e} g_i] = \Sigma_{t_j \in T} Pr[s \leq t_j \leq e](1 - Pr[s \leq t_j \leq e]) \quad \text{Equation 16}$$

The above discussion in connection with equations 9-16 describes how to find the cost of a specified bucket (b). Computing the minimum cost histogram can be done by comparing the cost of many different choices of bucket quantities (B). Since the cost is the sum of the costs of all the buckets (b) of the bucket quantity (B), the dynamic programming (DP) solution can be used to find the optimal cost. That is, the dynamic programming solution can be used to compute the cost of the optimal j bucket solution up to position l combined with the cost of the optimal k−j bucket solution over positions l+1 to n. This means finding the cost of $O(n^2)$ buckets. By analyzing the form of the above expressions for the cost of a bucket (b), enough information can be pre-computed to allow the cost of any specified bucket (b) to be found in time $O(1)$.

According to an illustrated example for the tuple pdf model, arrays of length n can be pre-computed as shown in equations 17, 18, and 19 below.

$$A[e] = \sum_{i=1}^{e} \left( \left( \sum_{t_j \in T} Pr[t_j = i](1 - Pr[t_j = i]) \right) + \left( \sum_{t_j \in T} Pr[t_j = i] \right)^2 \right) \quad \text{Equation 17}$$

$$B[e] = \sum_{i=1}^{e} Pr[t_j \leq e] \quad \text{Equation 18}$$

$$C[e] = \sum_{t_j \in T} (Pr[tj \leq e])^2 \quad \text{Equation 19}$$

In equations 17-19 above, $1 \leq e \leq s$ and $A[0]=B[0]=C[0]=0$. Thus, the sum-squared error cost $SSE((s,e),\bar{b})$ is (after symbolic manipulation) given by equation 20 below.

$$SSE((s,e), \bar{b}) = \quad \text{Equation 20}$$

$$A[e] - A[s-1] - \frac{(B[e] - B[s-1])(B[e] + B[s+1] + 1) - (C[e] - C[s-1])}{(e-s+1)}$$

With the input data (e.g., the data 100 of FIGS. 1 and 5) in sorted order, the arrays A[e], B[e], and C[e] can be computed with a linear pass over the input data. Thus, in view of the above discussion in connection with equations 9-20, an optimal or near optimal SSE histogram can be computed over probabilistic data presented in the value pdf or the tuple pdf models in time $O(m+Bn^2)$.

Turning now to determining histograms using the sum-squared-relative-error metric (SSRE(H)), the SSRE over deterministic data can be used to compute the difference between a representative bucket value ($\hat{b}$) and the value of each item (i) within the bucket (b). In this manner, the SSRE can be used to report the square of those differences as a ratio to the square of the corresponding value. An additional verification parameter (c) (e.g., a sanity parameter) limits the ratio to substantially reduce or eliminate the effects of any very small values in the bucket (b). The expected value of the ratio quantity can be used to compute the cost of a histogram using the SSRE metric as shown in equation 21.

$$SSRE(b, \hat{b}) = E_W \left[ \sum_{i=s}^{e} \frac{(g_i - \hat{b})^2}{\max(c^2, g_i^2)} \right] \quad \text{Equation 21}$$

In accordance with linearity of expectation, the cost given the representative bucket value ($\hat{b}$) can be computed by evaluating all frequencies which have a non-zero probability (i.e., at all $v \in V$). The SSRE cost can be computed using the value pdf model and the tuple pdf model as described below.

Using the value pdf model, the SSRE cost can be expressed as shown in equation 22 below in terms of the probability that, over all possible worlds (W), the i-th item has a frequency within the set of all frequencies (i.e., $v_j \in V$).

$$SSRE(b, \hat{b}) = \sum_{i=s}^{e} \sum_{v_j \in V} Pr[g_i = v_j] \frac{(v_j - \hat{b})^2}{\max(c^2, v_j^2)} \quad \text{Equation 22}$$

The cost shown in equation 22 above can be rewritten using the function $w(x)=1/\max(c^2,x^2)$, which is a fixed value once x is specified. Thus, the cost is rewritten as shown in Equation 23 below.

$$SSRE(b, \hat{b}) = \quad \text{Equation 23}$$

$$\sum_{i=s}^{e} \sum_{v_j \in V} \left( Pr[g_i = v_j]w(v_j)v_j^2 - 2Pr[g_i = v_j]w(v_j)v_j\hat{b} + Pr[g_i = v_j]w(v_j)\hat{b}^2 \right)$$

Equation 23 above, is a quadratic representation based on the representative bucket value ($\hat{b}$).

Using principles of calculus, the optimal or near optimal value of the representative bucket value ($\hat{b}$) to minimize the SSRE cost can be determined as shown in equation 24 below.

$$\hat{b} = \frac{\sum_{i=s}^{e} \sum_{v_j \in V} Pr[g_i = v_j]v_j w(v_j)}{\sum_{i=s}^{e} \sum_{v_j \in V} Pr[g_i = v_j]w(v_j)} \quad \text{Equation 24}$$

Substituting the expression of equation 24 above for the representative bucket value ($\hat{b}$) in equation 23 above gives equation 25 below.

$$SSRE(b, \hat{b}) = \quad \text{Equation 25}$$

$$\sum_{i=s}^{e} \sum_{v_j \in V} Pr[g_i = v_j]w(v_j)v_j^2 - \frac{\left( \sum_{i=s}^{e} \sum_{v_j \in V} Pr[g_i = v_j]v_j w(v_j) \right)^2}{\sum_{i=s}^{e} \sum_{v_j \in V} Pr[g_i = v_j]w(v_j)}$$

Based on equation 25 above, the following arrays of equations 26-28 can be determined and used to find a histogram that minimizes an objective error based on the SSRE error metric.

$$X[e] = \sum_{i=1}^{e} \sum_{v_j \in V} Pr[g_i = v_j] v_j^2 w(v_j) \quad \text{Equation 26}$$

$$Y[e] = \sum_{i=1}^{e} \sum_{v_j \in V} Pr[g_i = v_j] v_j w(v_j) \quad \text{Equation 27}$$

$$Z[e] = \sum_{i=1}^{e} \sum_{v_j \in V} Pr[g_i = v_j] w(v_j) \quad \text{Equation 28}$$

Using equations 26-28 above, the cost of any bucket (b) can be found in constant time using equation 29 below.

$$\min_{\hat{b}} SSE((s,e), \bar{b}) = X[e] - X[s-1] - \frac{(Y[e] - Y[s-1])^2}{Z[e] - Z[s-1]} \quad \text{Equation 29}$$

The example methods and apparatus described herein can then use dynamic programming (DP) techniques based on equation 29 above to find an optimal or near optimal set of buckets to represent a histogram.

Turning now to use of the tuple pdf model in connection with the SSRE error metric, for the SSRE cost measure, the cost for the bucket (b) using equation 22 above is the sum of costs obtained by each item (i) in the bucket (b). Thus, the example methods and apparatus described herein can be implemented to focus on the contribution to the cost made by a single item (i) and observe that equation 22 above depends only on the (induced) distribution giving $Pr[g_i=v_j]$. That is, there is no dependency on any other item (i). Thus, the induced value pdf can be computed for each item independently, and the above-described analysis associated with equations 26-29 can be used to determine an optimal or near optimal set of buckets. As discussed above, the induced value pdf provides $Pr[g_i=v]$ for some $v \in V$ and for each item (i). Unlike in the value pdf model, these induced pdfs are not independent. However, the induced pdfs can be computed for each item (i) independently and can be used to identify an optimal or near optimal bucket quantity based on a particular error metric. Thus, in view of the above discussion in connection with equations 21-29 above, an optimal or near optimal histogram based on the SSRE metric can be computed over probabilistic data presented in the value pdf model in time $O(m+Bn^2)$ and $O(m|V|+Bn^2)$ in the tuple pdf model.

Turning now to determining histograms using the sum-absolute-error histograms (SAE(H)), a set of possible value (V) that can be represented by the random variables ($g_i$) are indexed so that $v_1 \le v_2 \le \ldots \le v_{|V|}$. Given some representative bucket value ($\hat{b}$), let j' satisfy $v_{j'} \le \hat{b} \le v_{j'+1}$. (If the representative bucket value ($\hat{b}$) falls outside of $v_1 \ldots v_{|V|}$, 'dummy' values of $v_0=0$ and $v_{|V|+1}=\infty$ can be inserted into the data set.) The sum of absolute errors can be determined in accordance with equation 30 below.

$$SAE(b, \hat{b}) = \sum_{i=s}^{e} \sum_{v_j \in V} Pr[g_i = v_j]|\hat{b} - v_j|$$ Equation 30

$$= \sum_{i=s}^{e} (\hat{b} - v_{j'})Pr[g_i \le v_{j'}] + (v_{j'+1} - \hat{b})Pr[g_i \ge v_{j'+1}] +$$

$$\sum_{v_j \in V} \begin{cases} Pr[g_i \le v_j](v_{j+1} - v_j) & \text{if } v_j < v_{j'} \\ Pr[g_i > v_j](v_{j+1} - v_j) & \text{if } v_j \ge v_{j'} \end{cases}$$

The contribution of the first two terms of equation 30 above can be written as shown below in equation 31.

$(v_{j'+1}-v_{j'})Pr[g_i \le v_{j'}]+(\hat{b}-v_{j'+1})(Pr[g_i \le v_{j'}]-Pr[g_i \ge v_{j'+1}])$ Equation 31

Equation 31 above gives a quantity that is independent of the representative bucket value ($\hat{b}$) added to another quantity that depends linearly on $Pr[g_i \le v_{j'}]-Pr[g_i \le v_{j'+1}]$, which is defined in the example implementations described herein as an item value difference ($\Delta_{j'}$). Thus, if the item value difference is greater than zero (i.e., $\Delta_{j'}>0$), the cost can be reduced by making the representative bucket value ($\hat{b}$) closer to the value of the next data item ($v_{j'+1}$). However, if the item value difference is less than zero (i.e., $\Delta_{j'}<0$), the cost can be reduced by making the representative bucket value ($\hat{b}$) closer to the value of the current data item ($v_{j'}$). Therefore, the optimal or near optimal value of the representative bucket value ($\hat{b}$) occurs when it is made equal to some item value ($v_j$). This is true because when the value difference is equal to zero (i.e., $\Delta_{j'}=0$), the same result is generated regardless of whether the representative bucket value ($\hat{b}$) is set equal to the value of the current data item ($v_{j'}$), the value of the next data item ($v_{j'+1}$), or anywhere in between.

Thus, an assumption can be made that the representative bucket value ($\hat{b}$) is equal to a certain data item ($v_{j'}$) (i.e., $\hat{b}=v_{j'}$) for some $v_{j'} \in V$, and the expression of equation 32 can be stated according to this assumption.

$$SAE(b, \hat{b}) = \sum_{i=s}^{e} \sum_{v_j \in V} \begin{cases} Pr[g_i \le v_j](v_{j+1} - v_j) & \text{if } \hat{b} < v_j \\ Pr[g_i > v_j](v_{j+1} - v_j) & \text{if } \hat{b} \ge v_j \end{cases}$$ Equation 32

The SAE metric can then be expressed using monotone terms $P_{j,s,e}$ and $P^*_{j,s,e}$ as shown in equation 33 below.

$$SAE(b, \hat{b}) = \sum_{v_j < \hat{b}} P_{j,s,e}(v_{j+1} - v_j) + \sum_{v_j \ge \hat{b}} (P^*_{j,s,e})(v_{j+1} - v_j)$$ Equation 33

As shown in equation 33 above, $P_{j,s,e}$ is a monotone function that increases by the item index (j) while $P^*_{j,s,e}$ is a monotone function decreasing in the item index (j). In equation 33 above, there is a contribution of the value ($v_{j+1}-v_j$) for all values of the item index (j). This contribution is multiplied by the monotone function $P_{j,s,e}$ or the monotone function $P^*_{j,s,e}$. By stepping the representative bucket value ($\hat{b}$) through each of the values $v_1, v_2 \ldots v_{|V|}$, the effect of this contribution can be expressed as shown in equation 34 below.

$SAE(b,v_{l+1})-SAE(b,v_l)=(P_{l,s,e}-P^*_{l+1,s,e})(v_{l+1}-v_l)$ Equation 34

Because the monotone function $P_{j,s,e}$ increases in the item index (j), and the monotone function $P^*_{j,s,e}$ decreases in the item index (j), the quantity $P_{l,s,e}-P^*_{l+1,s,e}$ is monotone increasing in item position (t). Thus, SAE(b, $\hat{b}$) can have a single minimum value as the representative bucket value ($\hat{b}$) is varied, and the error metric value of SAE(b, $\hat{b}$) can increase in both directions away from the single minimum value. The single minimum value does not depend on the data item values ($v_j$). Instead, the minimum occurs (approximately) when the monotone functions are approximately equal to half of the item size of each bucket (b) (i.e., $P_{l,s,e} \approx P^*_{l+1,s,e} \approx n_b/2$, where $n_b=(e-s+1)$). Thus, the data item values ($v'_j$) can be expressed as shown in equation 35 below and setting the representative bucket value ($\hat{b}$) equal to the data item values ($v'_j$) (i.e., $\hat{b}=v'_j$) to obtain the optimal or near optimal SAE cost.

$$v'_j = \underset{v_l \in V}{\text{argmin}} \sum_{v_j < v_l \in V} P_{j,s,e} + \sum_{v_j > v_l \in V} P^*_{j,s,e}$$ Equation 35

Using the value pdf model in connection with the SAE error metric, the monotone values P and P* discussed above can be computed directly from the input pdfs. Using the value pdf model in connection with the SAE error metric, from the form of the expression for SAE as discussed above, there are no interactions between the random variable frequencies ($g_i$). Although the input specifies interactions and anti-correlations between different variables, for computing the SAE error in a bucket (b), each item (j) can be treated independently one at a time. Thus, the induced value pdf can be created (at an additional cost of $O(m|V|)$), and it is used in subsequent computations.

To find the cost of a given bucket (b), an optimal or near optimal representative bucket value (b̂) is first found. The values $\Sigma_{v_{j'}>l}P_{j,1,e}$ $(v_{j+1}-v_j)$ and $\Sigma_{v_{j'}<l}P^*_{j,1,e}$ $(v_{j+1}-v_j)$ are precomputed for all $v_j \in V$ and $e \in [n]$. Then, SAE(b, b̂) for any b̂∈V can be computed using equation 33 above. The minimum SAE error value attainable by any representative bucket value (b̂) can then be found by a ternary search over the values (V), using O(log |V|) probes. The time cost is O(|V|n) preprocessing to build tables of prefix sums, and O(log|V|) to find the optimal cost of a given bucket (b). Thus, in view of the above discussion related to the SAE metric approach, optimal or near optimal histograms based on the SAE metric can be computed over probabilistic data presented in the induced value pdf model in time O(n(|V|+Bn+n log |V|)). For all models of probabilistic data, |V|≤m is polynomial in the size of the input, so the total cost is polynomial in the size of the input.

Turning now to determining histograms using the sum-absolute-relative-error histograms (SARE(H)), for the sum of absolute relative errors, the bucket cost SARE(b, b̂) can be expressed as shown in equation 36 below.

$$E_W\left(\sum_{i=s}^{e} \frac{|gi - \hat{b}|}{\max(c, g_i)}\right) = \sum_{i=s}^{e} \sum_{v_j \in V} \frac{Pr[g_i = v_j]}{\max(c, v_j)}|v_j - \hat{b}| \quad \text{Equation 36}$$

$$= \sum_{i=s}^{e} \sum_{v_j \in V} w_{i,j}|v_j - \hat{b}|$$

In equation 36 above, $$w_{i,j} = \frac{Pr[g_i = v_j]}{\max(c, v_j)},$$

but more generally, the values for $w_{i,j}$ can be arbitrary non-negative weights. Setting the item index (j') so that $v_{j'} \leq \hat{b} \leq v_{j'+1}$, the cost can be written as shown in equation 37 below.

$$\sum_{i=s}^{e}\sum_{v_j \in V}\begin{cases} w_{i,j}(\hat{b}-v_j) & \text{if } v_j < \hat{b} \\ w_{i,j}(v_j-\hat{b}) & \text{if } v_j \geq \hat{b} \end{cases} = \sum_{i=s}^{e}\sum_{v_j \in V}\begin{cases} w_{i,j}\left(\hat{b}-v_{j'} + \sum_{v_j \leq v_l < v_{j'}} v_{l+1}-v_l\right) & \text{if } v_j < \hat{b} \\ w_{i,j}\left(v_{j'}-\hat{b} + \sum_{v_{j'} \leq v_l < v_j} v_{l+1}-v_l\right) & \text{if } v_j \geq \hat{b} \end{cases} \quad \text{Equation 37}$$

Equation 37 above can be rewritten as equation 38 below based on the following definitions: $W_{i,j}=\Sigma_{r=1}^{j}w_{i,r}$ and $W^*_{i,j}=\Sigma_{r=j+1}^{|V|}w_{i,r^*}$.

$$SARE(b, \hat{b}) = \sum_{i=s}^{e} W_{i,j'}(\hat{b} - v_{j'}) - \quad \text{Equation 38}$$

$$W^*_{i,j}(\hat{b} - v_{j'+1}) + \sum_{v_j \in V}\begin{cases} W_{i,j}(v_{j+1} - v_j) & \text{for } v_{j'} > v_j \\ W^*_{i,j}(v_j - v_{j-1}) & \text{for } v_{j'} \leq v_j \end{cases}$$

The same style of argument as above can be used to show that the optimal or near optimal choice of the representative bucket value (b̂) is when $\hat{b}=v_{j'}$ for some item index (j'). Equation 39 below can be written by defining $P_{j,s,e}=\Sigma_{i=s}^{e}W_{i,l}$ and $P^*_{j,s,e}=\Sigma_{i=s}^{e}W^*_{i,l}$.

$$SARE(b, \hat{b}) = \quad \text{Equation 39}$$

$$\sum_{v_{j'} > v_j \in V} P_{j,s,e}(v_{j+1} - v_j) + \sum_{v_{j'} \leq v_j \in V} P^*_{j,s,e}(v_{j+1} - v_j)$$

The expression of equation 39 above matches the form of equation 33. As discussed above in connection with equation 33, $P_{j,s,e}$ is a monotone function that increases by the item index (j) while $P^*_{j,s,e}$ is a monotone function decreasing in the item index (j). Therefore, the same argument holds to show that there is a unique minimum value of SARE, and it can be found by a ternary search over the range of value (V). In addition, the form of the cost in equation 37 shows that there are no interactions between different items (j), so the work of finding an optimal or near optimal histogram can be done using the induced value pdf model. By building corresponding data structures based on tabulating prefix sums of the new monotone functions P and P*, it is shown in light of the above-described equations 36-39 that optimal or near optimal SARE histograms can be computed over probabilistic data presented in the tuple and value pdf models in time O(n(|V|+Bn+n log |V|log n)).

The results based on the above discussion indicate that all discussed error metrics produce a cost at least $\Omega(Bn^2)$ due to the use of dynamic programming (DP) to find the optimal bucket boundaries (i.e., $b_k=(s_k, e_k)$). However, it is not always profitable to expend so much effort when the resulting histogram only approximates original input. That is, if an approximation in this way is tolerated, then one can also tolerate a histogram which achieves close to the optimal cost (e.g., a near optimal cost) rather than an exact optimal cost. In some example implementations, it is suitable to find a histogram having a cost that is at most (1+ε) multiplied by the cost of the optimal histogram in time much faster than $\Omega(Bn^2)$.

Instead of considering every possible bucket (b), properties of the error measure (e.g., the error measures SSE, SSRE, SAE, and SARE discussed above) can be used with only a subset of possible buckets (b) to increase the speed of a search. The following conditions hold for all the previously considered error measures: (1) the error of a bucket (b) only depends on the size of the bucket (b) and the distributions of the items falling within it; (2) the overall error is the sum of the errors across all buckets (B); (3) information can be preserved so that given any bucket (b) the best representative bucket value (b̂) and corresponding error can be computed efficiently; (4) the error is monotone, so that the error for any interval of items is no less than the error of any contained subinterval; and (5) the total error cost is bounded as a polynomial in the size of the input. In light of these properties and the preprocessing described above in connection with the different cumulative error metrics, a (1+ε)-approximation to the optimal histogram for SSE, SSRE, SAE, and SARE with $$O\left(\frac{1}{\varepsilon}B^2 n\log n\right)$$

bucket cost evaluations can be determined using histogram approximation techniques such as, for example, techniques described by Guha et al. in "Approximation and Streaming Algorithms for Histogram Construction Problems," ACM Transactions on Database Systems, vol. 21, no. 1, pp. 396-438, 2006, which is incorporated herein by reference in its entirety.

Turning now to the use of maximum absolute error (MAE) and maximum absolute relative error (MARE) metrics to determine optimal or near optimal histograms, unlike using the cumulative error metrics described above, the linearity properties described above cannot immediately be used with the MAE and MARE metrics. The example methods and apparatus described herein can use the MAE and MARE error metrics by focusing on bounding the maximum value of the per-item expected error. That is, the frequency of each item in a bucket is considered in turn for the expectation ($E_W$) and the maximum over the resulting costs is determined. The costs can be expressed for each of MAE and MARE as shown below in equations 40 and 41.

$$MAE(b, \hat{b}) = \max_{s \leq i \leq e} \sum_{v_j \in V} Pr[g_i = v_j]|v_j - \hat{b}| \quad \text{Equation 40}$$

$$MARE(b, \hat{b}) = \max_{s \leq i \leq e} \sum_{v_j \in V} \frac{Pr[g_i = v_j]}{\max(c, v_j)}|v_j - \hat{b}| \quad \text{Equation 41}$$

The MAE and MARE expressions of equations 40 and 41 above can be represented as $\max_{s \leq i \leq e} \sum_{j=1}^{|V|} w_{i,j}|v_j - \hat{b}|$, where $w_{i,j}$ are non-negative weights independent of the representative bucket value ($\hat{b}$). Based on such representations of the MAE and MARE error metrics, a maximum error for the value of each item (i) can be derived over $n_b$ parallel instances of a sum-absolute relative error (SARE) problem. Based on the above discussion in connection with the sum-absolute-relative-error (SARE) metric, each function $f_i(b) = \sum_{j=1}^{|V|} |v_j - \hat{b}|$ has a single minimum value, and the single minimum value increases away from its minimum. In addition, the upper envelope of these functions, given by $\max_{s \leq i \leq e} f_i(b)$, also has a single minimum value, and the upper envelope increases as the functions move away from the single minimum value. Thus, a ternary search can be performed over the data item values ($v_j$) to find an item index (j') such that the optimal or near optimal representative bucket value ($\hat{b}$) lies between a current data item value ($v_{j'}$) and a next data item value ($v_{j'+1}$). Each evaluation for a chosen representative bucket value ($\hat{b}$) can be completed in time $O(n_b)$. That is, the cost can be improved by using appropriate precomputations, but this will not significantly alter the asymptotic cost of the whole operation. The ternary search over the values in V takes $O(\log|V|)$ evaluations, giving a total cost of $O(n_b \log |V|)$.

By requiring the representative bucket value ($\hat{b}$) to lie in the range between a current data item value ($v_{j'}$) and a next data item value ($v_{j'+1}$), the cost under MARE can be expressed as shown below in equation 42.

$$MARE(b, \hat{b}) = \max_{s \leq i \leq e} \alpha_i(\hat{b} - v_{j'}) + \beta_i(v_{j'+1} - \hat{b}) + \gamma_i \quad \text{Equation 42}$$

$$= \max_{s \leq i \leq e} \hat{b}(\alpha_i - \beta_i) + (\gamma_i + \beta_i v_{j'+1} - \alpha_i v_{j'})$$

In equation 42 above, the coefficients $\alpha_i, \beta_i, \gamma_i$ are determined based on the item index (j'), the weighting values ($w_{i,j}$) and the data item values ($v_j$). In addition, the coefficients $\alpha_i, \beta_i, \gamma_i$ are independent of the representative bucket value ($\hat{b}$). Thus, a maximum value of a set of univariate linear functions in the range of $v_{j'} \leq \hat{b} \leq v_{j'+1}$ must be minimized. This can be accomplished by recursively finding the intersection of convex hulls of subsets of the linear functions to yield an $O(n_b \log n_b)$ time algorithm. Combining these, it can be determined that evaluating the optimal or near optimal representative bucket value ($\hat{b}$) and the corresponding cost for a given bucket (b) takes time $O(n_b \log n_b |V|)$. The dynamic programming (DP) solution can then be used, since the principle of optimality holds for the MAE and MARE error metrics. Because of the structure of the cost function, the tuple pdf model and the induced pdf model can be implemented in similar manners. In light of the preprocessing described above in connection with the MAE and MARE metrics, the optimal or near optimal B bucket histogram under these metrics over input data in either tuple or value pdf models can be found in time $O(n^2(B+n \log n |V|))$.

The above discussions have primarily been directed to finding optimal or near optimal histograms to summarize probabilistic or uncertain data using a particular number of buckets (B) while minimizing the cost based on a given error objective based on one of the cumulative error metrics SSE, SSRE, SAE, and SARE or maximum error metrics MAE and MARE. However, the example methods and apparatus described herein can also be used to find optimal or near optimal wavelet structures to summarize probabilistic or uncertain data. The following describes wavelet-based implementations of the example methods and apparatus.

Figure 6:
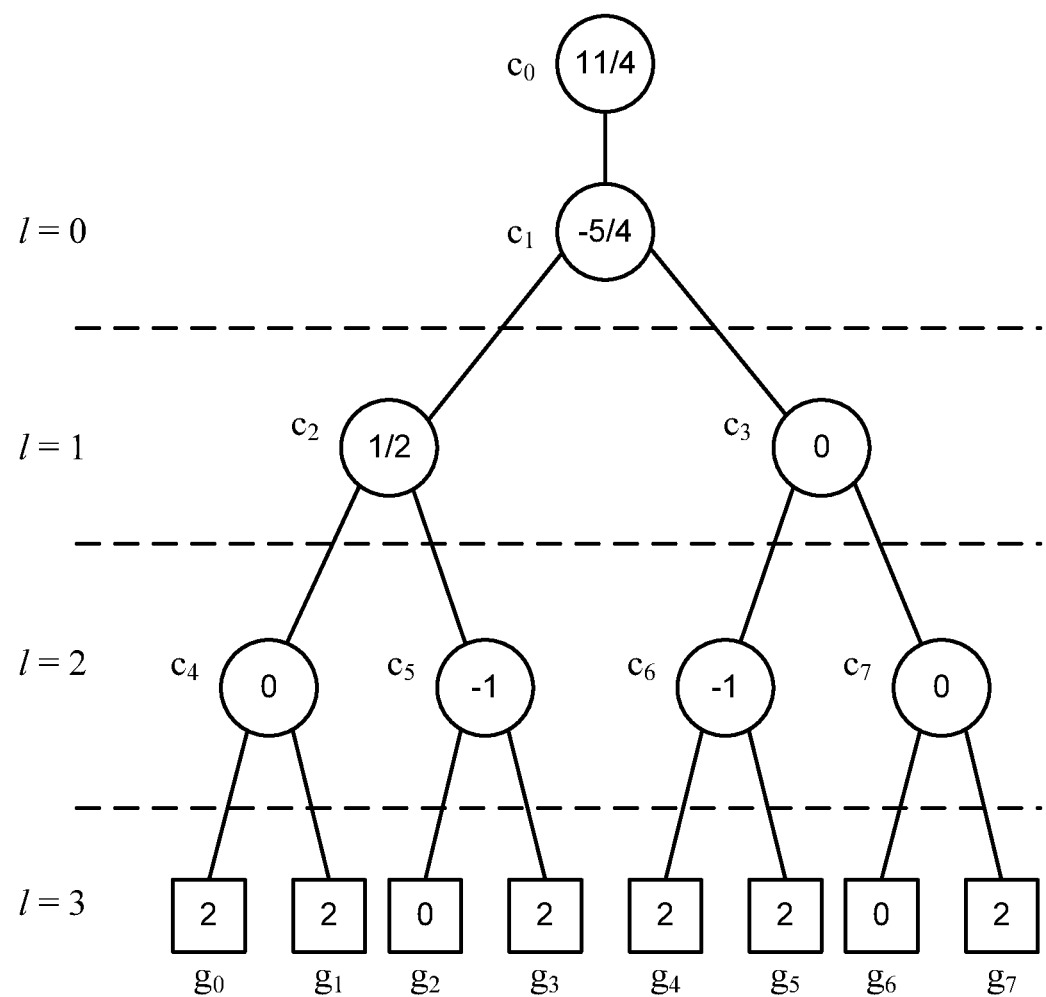
FIG. 6 is an example coefficient tree structure that can be used to summarize probabilistic data using a discrete wavelet transform (DWT) process.

FIG. 6 is an example coefficient tree structure 600 that can be used to summarize or represent probabilistic data using a Haar discrete wavelet transform (DWT) process. Haar wavelet synopses provide another data reduction tool based on the Haar Discrete Wavelet Decomposition (i.e., a DWT process) for hierarchically decomposing functions. At a high level, the Haar DWT of a data distribution over the probabilistic data domain [n] consists of a coarse overall approximation (the average of all frequencies) together with n−1 detail coefficients (constructed through recursive pair-wise averaging differencing) that influence the reconstruction of frequency values at different scales. The Haar DWT process can be visualized through the binary coefficient tree structure 600 of FIG. 6. In FIG. 6, leaf nodes ($g_i$) correspond to the original data distribution values in the data distribution array A[2, 2, 0, 2, 3, 5, 4, 4]. The root node $c_0$ is the overall average frequency, whereas each internal node $c_i$ (i=1, ..., 7) is a detail coefficient computed as half of the difference between the average of frequencies in the internal nodes ($c_i$) of the left child subtree and the average of frequencies in the internal nodes ($c_i$) of the right child subtree (e.g., $$c_3 = \frac{1}{2}\left(\frac{3+5}{2} - \frac{4+4}{2}\right) = 0).$$

Coefficients in level (l) are normalized by a factor of $\sqrt{2^l}$. This makes the DWT an orthonormal basis, which preserves the $L_2$ norm.

In the illustrated example, any data value ($g_i$) can be reconstructed as a function of the coefficients which are proper ancestors of the corresponding node in the coefficient tree 600. The reconstructed value can be found by summing appropriately scaled multiples of these log N+1 coefficients ($c_i$) alone. The support of a coefficient ($c_i$) is defined as the interval of data values that the coefficient ($c_i$) is used to reconstruct. The interval of data values is a dyadic interval of size $2^{\log n - l}$ for a coefficient at one of the resolutions levels (l) shown in FIG. 6.

Given limited space for maintaining a wavelet synopsis, a thresholding procedure retains a quantity (C) of Haar coefficients to be much less than an input data set size (n) (i.e., C<<n). That is, the DWT defines n coefficients, for an input of length n, and the thresholding procedure is used to retain a quantity (C) of these coefficients. In this manner, the Haar coefficient quantity (C) provides a highly-compressed approximate representation of the data (remaining coefficients are implicitly set to zero). As in the histogram construction described above, the methods and apparatus described herein can be used to determine the best or near best subset of C coefficients to retain such that some overall error measure is minimized. By orthonormality of the normalized Haar basis, picking a coefficient quantity (C) (absolute, normalized) of the largest coefficients (based on absolute normalized value) is optimal for meeting an error objective based on the SSE error metric. To determine optimal and approximate thresholding under different error metrics, a dynamic program can be used over the coefficient-tree structure (e.g., the tree structure of FIG. 6) that tabulates the optimal solution for a subtree rooted at node ($c_j$) given the contribution from the choices made at proper-ancestor nodes of ($c_j$) in the tree. This technique can be used across a broad class of distributive error metrics (including the error measures discussed above in connection with finding an optimal or near optimal histogram).

Two distinct example versions of the thresholding problem for non-SSE error metrics include a restricted version and a non-restricted version, both of which can be used to find the best or near best subset of C coefficients to retain. In the restricted version, the thresholding algorithm selects values for the synopsis from the standard Haar coefficient values (computed as discussed above), which can lead to sub-optimal synopses for a non-SSE error metric. In the unrestricted version of the thresholding problem, retained coefficient values are chosen to optimize or substantially optimize the target error metric. For example, let OPTW[j, b, v] denote the optimal error contribution across all frequencies of data values ($g_i$) in the support (i.e., subtree) of coefficient ($c_j$) assuming a total space budget of (C) coefficients retained in the subtree of the coefficient ($c_j$) subtree and also assuming a partial reconstructed value of an item value (v) based on the choices made at proper ancestors of ($c_j$). Then, based on the Haar DWT reconstruction process, OPTW[j, b, v] can be computed as the minimum of two alternative error values at the coefficient ($c_j$).

The first error value is an optimal error when retaining the best value ($v_j$) for the coefficient ($c_j$). This first optimal error can be determined by minimizing over all of the item values ($v_j$) for the coefficient ($c_j$) and allotments of the remaining budget across the left and right child of the coefficient ($c_j$). This minimization process can be implemented using equation 43 below.

$$OPTW_r[j, b, v] = \min_{v_j, 0 \leq b' \leq b-1} \left\{ h\left( \begin{array}{c} OPTW[2j, b', v + v_j], \\ OPTW[2j+1, b-b'-1, v - v_j] \end{array} \right) \right\} \quad \text{Equation 43}$$

The second error value is an optimal error when not retaining the coefficient ($c_j$) and can be determined using equation 44 below.

$$OPTW_{nr}[j, b, v] = \min_{v_j, 0 \leq b' \leq b} \left\{ h\left( \begin{array}{c} OPTW[2j, b', v + v_j], \\ OPTW[2j+1, b-b'-1, v] \end{array} \right) \right\} \quad \text{Equation 44}$$

In equations 43 and 44 above, h( ) stands for a summation (max { }) for cumulative (or maximum) error-metric objectives. In the restricted version of the thresholding problem, minimization over the item values ($v_j$) is eliminated (since the value for the coefficient ($c_j$) is fixed), and the values for the incoming contribution value (v) can be computed by stepping through all possible subsets of ancestors for the coefficient ($c_j$)—since the depth of the tree is O(log n), an $O(n^2)$ thresholding algorithm can be used. In the unrestricted case of the thresholding problem, approximation schemes that employ techniques for bounding and approximating the range of possible values (v) can be employed. Example approximation schemes include, for example, techniques described by Guha et al., in "Wavelet Synopsis for data streams: minimizing non-Euclidean error," ACM SIGKDD, 2005, which is incorporated herein by reference in its entirety.

The following describes using the Haar wavelet DWT techniques described above in connection with error metrics to find the best or near best subset of C coefficients to retain such that an overall error measure is minimized. That is, the subset of C coefficients is selected such that it optimally or near optimally summarizes the item values ($v_j$) in an uncertain dataset with minimal error to provide relatively better accuracy in obtaining or indicating information of interest in that uncertain dataset.

Turning to the use of the SSE error metric to determine an optimal or near optimal wavelet synopsis, any input defining a distribution over original data values ($g_i$) also implies a distribution over Haar wavelet coefficients ($c_i$). In particular, the technique involves a possible-worlds distribution over Haar DWT coefficients with $c_i(W)$ denoting the instantiation of the coefficient ($c_i$) in the possible world (W) (defined by the data values of the possible world $g_i(W)$). The goal is to pick a quantity (C) of coefficient indices (I) and corresponding representative coefficient values ($\hat{c}_i$) (i.e., a synopsis for the data items in the interval of that coefficient ($c_i$)) for each i∈I to minimize the expected SSE error in the data approximation. Computing an expected SSE error (i.e., $E_W[SSE(S_w(I))]$) involves determining a probabilistic expected error for each coefficient interval, and the probabilistic expected error is indicative of the quality or accuracy with which each resulting synopsis $S_w(I)$ (or representative coefficient value ($\hat{c}_i$) represents the data items ($g_i$) in a respective or corresponding coefficient interval. In the example implementations described herein, each probabilistic expected error ($E_w[SSE(S_w(I))]$) is indicative of an error deviation between any particular item ($g_i$) in a particular coefficient interval and the synopsis $S_w(I)$ (or representative coefficient value ($\hat{c}_i$) describing that coefficient interval and its items ($g_i$)). Using Parseval's theorem and linearity of the Haar transform in each possible world (W), the SSE error of the data approximation is the SSE error in the approximation of the normalized wavelet coefficients ($c_i$). By linearity of expectation, the expected SSE error for the resulting synopsis $S_w(I)$ is shown in equation 45 below.

$$E_W[SSE(S_w(I))] = \sum_{i \in I} E_W[(c_i - \hat{c}_i)^2] + \sum_{i \notin I} E_W[(c_i)^2] \quad \text{Equation 45}$$

In equation 45 above, by including an item (i) in the index set (I) of selected coefficients ($c_i$), the optimal or near optimal setting of the representative coefficient value ($\hat{c}_i$) is the expected value of the i-th (normalized) Haar wavelet coefficient.

This can be expressed using equation 46 below.

$$\mu_{c_i} = E_W[c_i] = \Sigma_{w_j} Pr[c_i = w_j] \cdot w_j \quad \text{Equation 46}$$

Equation 46 above can be computed over the set of values taken on by the coefficients ($w_j$). Further, by linearity of expectation and the fact that the Haar wavelet transform can be thought of as a linear operator (H) applied to the input vector (A), equation 47 below can be derived from equation 46 above.

$$\mu_{c_i} = E_W[H_i(A)] = H_i(E_W[A]) \quad \text{Equation 47}$$

In other words, the optimal setting ($\mu_{c_i}$) of the representative coefficient value ($\hat{c}_i$) can be determined by computing the wavelet transform of the expected item value frequencies ($E_W(g_i)$). Thus, the optimal setting ($\mu_{c_i}$) can be computed with linear processing from the input using either tuple pdf or value pdf form. Based on the above observation, the expected SSE can be rewritten as shown in equation 48 below.

$$E_W[SSE(S_w(I))] = \Sigma_{i \in I} \sigma_{c_i}^2 + \Sigma_{i \notin I} E_W[(c_i)^2] \quad \text{Equation 48}$$

In equation 48 above, $\rho_{c_i}^2 = Var_W[c_i]$ is the variance of the coefficient ($c_i$). Based on the above expression of equation 48, the optimal strategy is to pick the C coefficients giving the largest reduction in the expected SSE error (since there are no interactions across coefficients). In addition, the benefit of selecting coefficient i is exactly $E[(c_i)^2] - \sigma_{c_i}^2 = \mu_{c_i}^2$. Thus, the thresholding scheme that optimizes the expected SSE error involves selecting the C Haar coefficients with the largest (absolute) expected normalized value. (This technique naturally generalizes the conventional deterministic SSE thresholding case discussed above in connection with finding a histogram.) In light of the above SSE error discussion in connection with equations 45-48, with O(n) time and space, an optimal SSE wavelet representation of uncertain or probabilistic data can be computed using the tuple pdf model or the value pdf model.

Turning to the use of non-SSE error metrics to determine an optimal or near optimal wavelet synopsis, the dynamic programming (DP) recurrence formulated over the Haar coefficient error tree for non-SSE error metrics can be implemented for probabilistic data by defining the optimal wavelet OPTW [j,b,v] to denote the expected optimal value for the error metric of interest. The recursive computation steps are the same as discussed above for finding the optimal histogram OPTH[j,b]. However, with the coefficient-tree DP recurrence, almost all of the actual error computation takes place at the leaf (i.e., data) nodes (i.e., the item values $g_i$ of FIG. 6). The DP recurrences combine these computed error values appropriately in a bottom-up fashion. Using equation 49 below, the expected point-error value (e.g., a probabilistic expected error) can be computed to perform leaf-error computations.

$$E_W[err(g_i, v)] = \sum_W Pr[W] \cdot err(g_i(W), v) \quad \text{Equation 49}$$

Equation 49 can be computed over all possible worlds $W \in W'$. However, the computation can still be done in O(1) time assuming precomputed data structures similar to those having been derived for error objectives in the histogram case described above. For example, for absolute relative error metrics (i.e., $err(g_i, \hat{g}_i) = w(g_i) \cdot |g_i - \hat{g}_i|$, wherein $w(g_i) = 1/\max\{c, |g_i|\}$), the expected error at the item value ($g_i$) can be expanded using equation 50 below.

$$OPTW[i, 0, v] = E_W[w(g_i) \cdot |g_i - v|] = \quad \text{Equation 50}$$
$$\sum_{v_j \in V} Pr[g_i = v_j] w(v_j) \cdot \begin{cases} (v - v_j) & \text{if } v > v_j \\ (v_j - v) & \text{if } v \leq v_j \end{cases}$$

In equation 50 above, (V) denotes the set of possible values for any frequency random variable ($g_i$). Thus, this is an instance of the sum-absolute-relative-error (SARE) error thresholding problem, because the form of this optimization of equation 50 matches the form for SARE discussed above in connection with equation 30. By precomputing appropriate arrays of size O(|V|) for each item (i), the optimal or near optimal split point $v_j \in V$ can be searched for in time O(log|V|).

The above precomputation techniques for non-SSE error metrics can be similarly applied to other error metrics as well, and enable relatively easily carrying over the algorithms and results (modulo the small O(log |V|) factor above) for the restricted case, where all coefficient values are fixed (e.g., to their expected values as required for expected SSE minimization). In light of the above discussion in connection with non-SSE error metrics, optimal restricted wavelet synopses for non-SSE error metrics can be computed over data presented in the (induced) value pdf model in time O(n(|V|+n log |V|)).

For the unrestricted version of the thresholding problem, different techniques can be used to bound and quantize the range of possible coefficient values to consider in the case of probabilistic data at the leaf nodes of a tree. An example technique involves the use of pessimistic coefficient-range estimates (e.g., based on the minimum/maximum possible frequency values). Another example technique involves employing tail bounds on the item values ($g_i$) (e.g., Chernoff bounds since tuples can be seen as binomial variables) to derive tighter, high-probability ranges for coefficient values.

Figure 7:
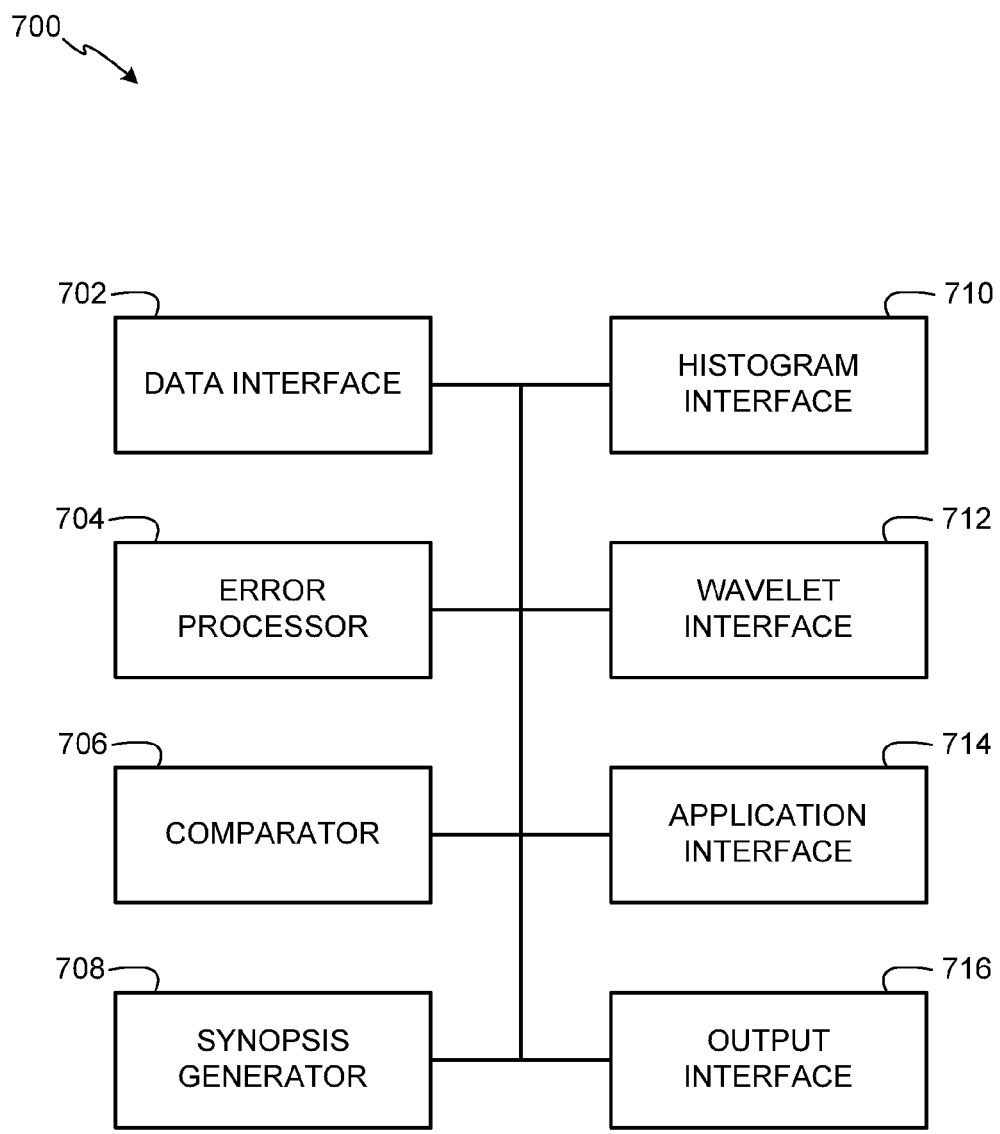
FIG. 7 is a block diagram of an example apparatus that can be used to find optimal or near optimal histogram and/or wavelet structures to summarize probabilistic or uncertain data.

FIG. 7 is a block diagram of an example apparatus 700 that can be used to find optimal or near optimal histogram and/or wavelet structures to summarize or represent probabilistic or uncertain data using particular quantities of buckets (B) or wavelet coefficients (C) while minimizing the cost based on a given error objective. In the illustrated example, the example apparatus 700 includes a data interface 702, an error processor 704, a comparator 706, a synopsis generator 708, a histogram interface 710, a wavelet interface 712, an application interface 714, and an output interface 716. The example apparatus 700 may be implemented using any desired combination of hardware, firmware, and/or software. For example, one or more integrated circuits, discrete semiconductor components, and/or passive electronic components may be used. Thus, for example, any of the data interface 702, the error processor 704, the comparator 706, the synopsis generator 708, the histogram interface 710, the wavelet interface 712, the application interface 714, and/or the output interface 716, or parts thereof, could be implemented using one or more circuit(s), programmable processor(s), application specific integrated circuit(s) (ASIC(s)), programmable logic device(s) (PLD(s)), field programmable logic device(s) (FPLD(s)), etc.

Figure 14:
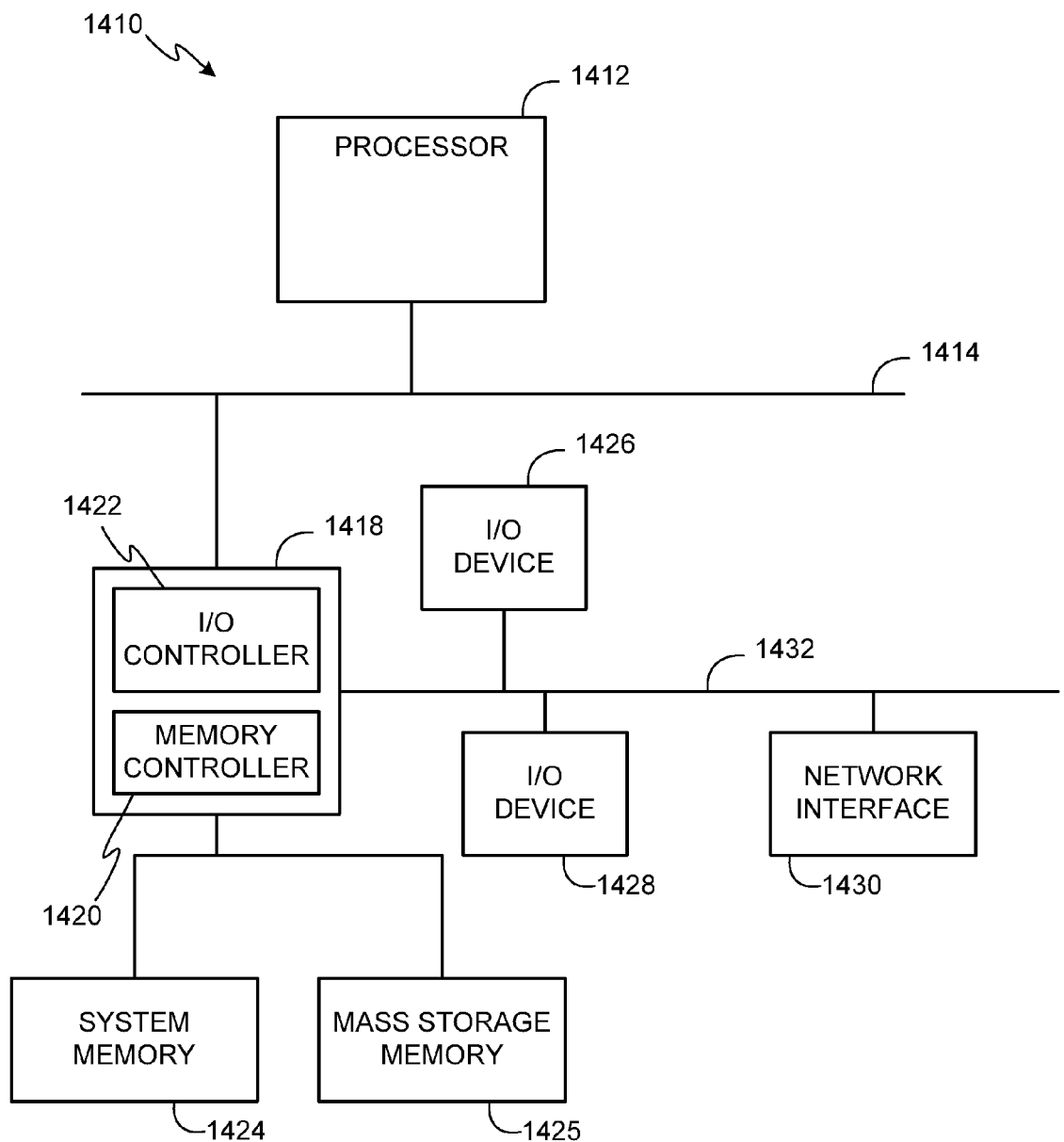
FIG. 14 is a block diagram of an example processor system that may be used to execute the example machine readable instructions of FIGS. 8, 9, and/or 10 to implement the example apparatus of FIG. 7.

Some or all of the data interface 702, the error processor 704, the comparator 706, the synopsis generator 708, the histogram interface 710, the wavelet interface 712, the application interface 714, and/or the output interface 716, or parts thereof, may be implemented using instructions, code, and/or other software and/or firmware, etc. stored on a machine accessible medium and executable by, for example, a processor system (e.g., the example processor system 1410 of FIG. 14). When any of the appended claims are read to cover a purely software implementation, at least one of the data interface 702, the error processor 704, the comparator 706, the synopsis generator 708, the histogram interface 710, the wavelet interface 712, the application interface 714, and/or the output interface 716 is hereby expressly defined to include a tangible medium such as a memory, DVD, CD, etc.

The example apparatus 700 is provided with the data interface 702 to access one or more memories from which to retrieve input data (e.g., the probabilistic data 100 of FIGS. 1 and 5) and in which to store data (e.g., error measures, synopses, bucket data, coefficient data, histogram data, wavelet data, etc.). The example apparatus 700 is provided with the error processor 704 to determine error values associated with different histogram and wavelet constructions based on the error metrics discussed above in connection with finding optimal or near optimal histograms and/or wavelets to summarize input data.

The example apparatus 700 is provided with the comparator 706 to compare target error objective values with error measures associated with different histogram and/or wavelet constructions. In this manner, optimal or near optimal histograms and/or wavelets can be selected by minimizing associated error measures to be at or below the target error objective values.

The example apparatus 700 is provided with a synopsis generator 708 to determine synopses for different buckets (b) of a histogram and/or coefficients (c) of a wavelet tree structure to represent different input data items in respective histogram buckets or wavelet structure leaf nodes. For example, the synopsis generator 708 can determine representative bucket values ($\hat{b}$) and representative coefficient values (c).

The example apparatus 700 is provided with the histogram interface 710 to manage and adjust histogram-related parameters associated with finding an optimal or near optimal histogram to represent probabilistic input data. For example, the histogram interface 710 can be configured to perform operations such as increasing or decreasing bucket quantities (B), defining or changing bucket boundaries ($s_k, e_k$), selecting representative bucket values ($\hat{b}$) for the different buckets (B), and any other operation discussed above in connection with generating histograms to represent probabilistic input data.

The example apparatus 700 is provided with the wavelet interface 712 to manage and adjust wavelet-related parameters associated with finding an optimal or near optimal wavelet coefficient tree structure to represent probabilistic input data. For example, the wavelet interface 712 can be configured to perform operations such as increasing or decreasing the wavelet coefficient quantities (C), selecting the interval or range of data items (i) to be represented by each wavelet coefficient ($c_i$) and selecting coefficient values ($\hat{c}_i$) to represent the different coefficients (C).

In some example implementations, the example apparatus 700 may be provided with the histogram interface 710 but not the wavelet interface 712 if the apparatus 700 is to be used for finding optimal or near optimal histograms to represent or organize probabilistic data. In other example implementations, the example apparatus 700 may be provided with the wavelet interface 712 but not the histogram interface 710 if the apparatus 700 is to be used for finding optimal or near optimal wavelet coefficient tree structures to represent or organize probabilistic data.

The example apparatus is provided with the application interface 714 to use the histogram and/or wavelet structures generated by the apparatus 700 to provide output values based on the probabilistic input data. For example, the application interface 714 may be configured to communicate with a data mining or searching user interface via which users enter queries to retrieve information of interest. Alternatively or additionally, the application interface 714 may be configured to interface to a measuring device or meter configured to analyze probabilistic data obtained based on measurements or data acquisitions performed on a subject of interest. Such measurements or data acquisitions may include information collected using RFID communications, metering instrumentation, etc. Other data acquisitions may be associated with enabling data communications across wired or wireless interfaces. For example, measurements may include signal strengths, bandwidth availabilities, communication delays, etc. In addition, the application interface 714 may be configured to interface with communication devices to discern information (e.g., data, voice, audio, etc.) that is communicated between different nodes or devices on a network.

The example apparatus 700 is provided with the output interface 716 to output any results as requested via the application interface 714. The output interface 716 may be implemented using a wireless or wired communication interface or a display interface.

Although the application interface 714 and the output interface 716 are shown as being implemented in the example apparatus 700, in other example implementations, the application interface 714 and the output interface 716 may be implemented on a separate apparatus. For example, the application interface 714 and the output interface 716 may be implemented in connection with a device or processor system configured to analyze probabilistic data based on histogram structures or wavelet coefficient tree structures generated by the example apparatus 700 and stored in a memory accessible by the other apparatus having the application interface 714 and the output interface 716.

Figure 8:
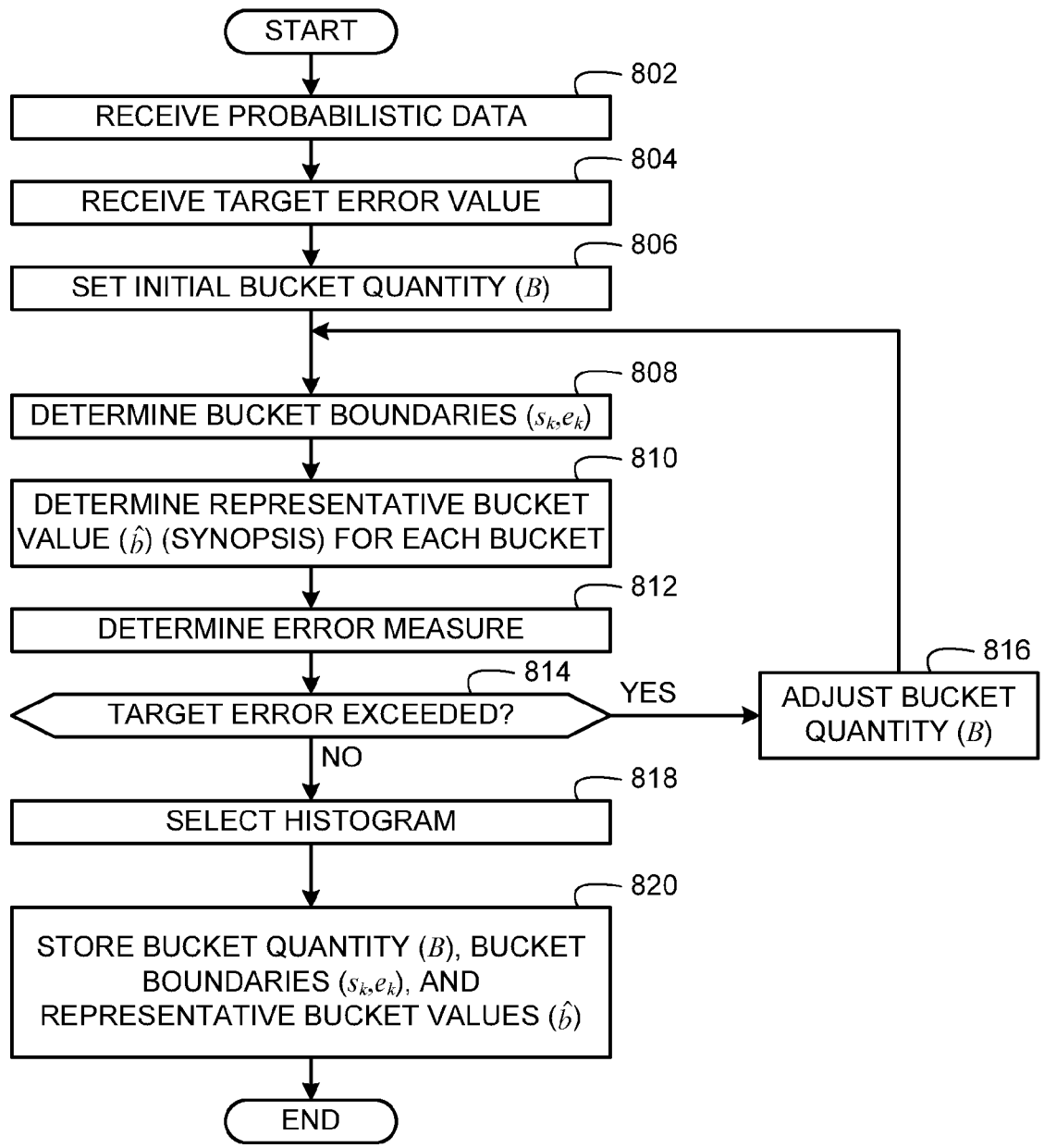
FIG. 8 is a flowchart representative of example machine readable instructions that may be executed to implement the example apparatus of FIG. 7 to generate optimal or near optimal histograms to represent and/or summarize probabilistic data.
Figure 9:
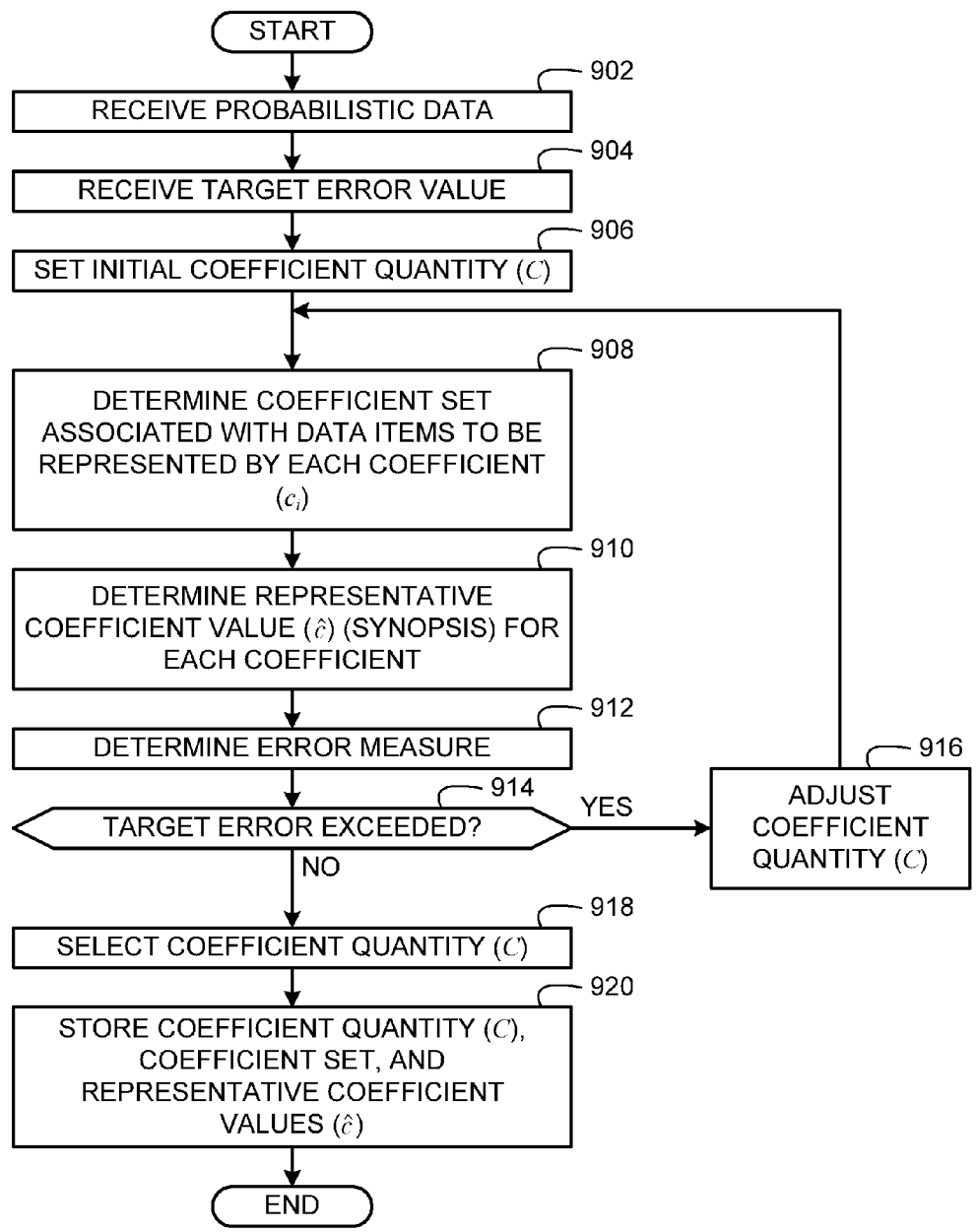
FIG. 9 is a flowchart representative of example machine readable instructions that may be executed to implement the example apparatus of FIG. 7 to generate optimal or near optimal wavelet coefficient tree structures to represent and/or summarize probabilistic data.
Figure 10:
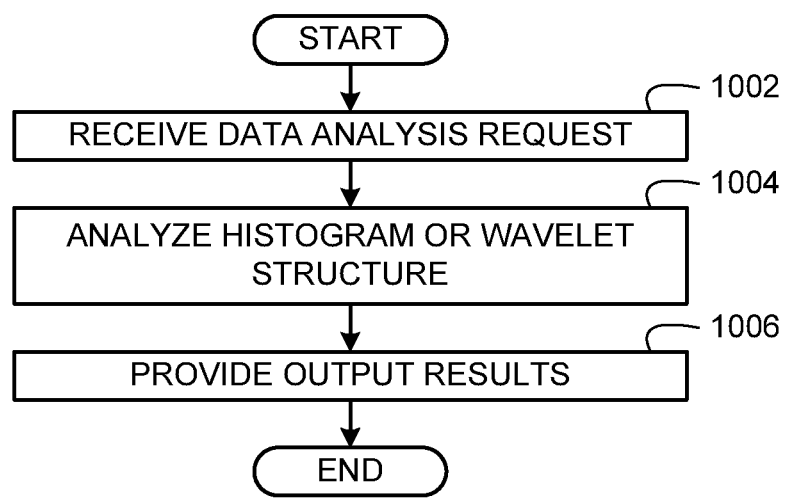
FIG. 10 is a flowchart representative of example machine readable instructions that may be executed to output data values based on analyzing the histogram and/or wavelet structures generated using the example processes of FIGS. 8 and 9.

FIG. 8 is a flowchart representative of example machine readable instructions that may be executed to implement the example apparatus 700 of FIG. 7 to generate optimal or near optimal histograms to represent and/or summarize probabilistic data. FIG. 9 is a flowchart representative of example machine readable instructions that may be executed to implement the example apparatus 700 of FIG. 7 to generate optimal or near optimal wavelet coefficient tree structures to represent and/or summarize probabilistic data. FIG. 10 is a flowchart representative of example machine readable instructions that may be executed to output data values based on analyzing the histogram and/or wavelet structures generated using the example processes of FIGS. 8 and 9. The example processes of FIGS. 8-10 may be performed using a processor, a controller, and/or any other suitable processing device. For example, the example processes of FIGS. 8-10 may be implemented in coded instructions stored on a tangible medium such as a flash memory, a read-only memory (ROM), and/or a random-access memory (RAM) associated with a processor (e.g., the example processor 1412 discussed below in connection with FIG. 14). Alternatively, one or both of the example processes of FIGS. 8-10 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or both of the example processes of FIGS. 8-10 may be implemented manually or as any combination(s) of any of the foregoing techniques, for example, any combination of firmware, software, discrete logic and/or hardware. Further, although the example processes of FIGS. 8-10 are described with reference to the flow diagrams of FIGS. 8-10, other methods of implementing the processes of FIGS. 8-10 may be employed. For example, the order of execution of the blocks may be changed, and/or some of the blocks described may be changed, eliminated, sub-divided, or combined. Additionally, one or both of the example processes of FIGS. 8-10 may be performed sequentially and/or in parallel by, for example, separate processing threads, processors, devices, discrete logic, circuits, etc.

Turning to FIG. 8, initially the data interface 702 (FIG. 7) receives input probabilistic data (block 802) (e.g., the probabilistic data 100 of FIGS. 1 and 5) and a target error value (block 804). For example, the data interface 702 may receive the probabilistic data and the target error value from a memory storage device. The histogram interface 710 (FIG. 7) sets an initial bucket quantity (B) (block 806) and determines bucket boundaries $(s_k, e_k)$ (block 808) for each of the buckets (b) of the bucket quantity (B).

The synopsis generator 708 (FIG. 7) determines a representative bucket value $(\hat{b})$ (i.e., a synopsis) for each bucket (b) (block 810). For example, the synopsis generator 708 may determine the representative bucket values $(\hat{b})$ using the techniques described above in connection with generating an optimal or near optimal histogram. The error processor 704 (FIG. 7) determines an error measure (block 812) based on the bucket quantity (B), the bucket boundaries $(s_k, e_k)$, and the representative bucket values $(\hat{b})$. In the illustrated example, determining the error measure involves determining a probabilistic expected error (i.e., a bucket error expectation value $(E_W)$ of $E_W[BE(b, \hat{b})])$ for each bucket (b), where the probabilistic expected error is indicative of the quality or accuracy with which each representative bucket value $(\hat{b})$ represents the items (i) in a respective or corresponding bucket (b). The error processor 704 may determine the error measure as described above using on any of the cumulative error metrics SAE, SARE, SSE, or SSRE or maximum error metrics MAE or MARE. Selecting any particular one of the error metrics may be based on the uncertainty associated with the probabilistic data and/or the particular application for which the probabilistic data is being summarized or organized. For example, if the probabilistic data includes instrument-based measurement values, a different one of the error metrics may be more suitable than if the probabilistic data included medical records or personnel records.

The comparator 706 (FIG. 7) determines whether the calculated error measure exceeds the target error value received at block 804 (block 814). If the calculated error measure exceeds the target error value (block 814), the histogram interface 710 adjusts (e.g., increases) the bucket quantity (B) (block 816) and control returns to block 808 so that bucket boundaries $(s_k, e_k)$ can be redefined and the error measure can be re-calculated based on the updated histogram configuration. In some example implementations, if the calculated error measure is too low (i.e., the calculated error measure is much less than the target error value), the histogram interface 710 may decrease the bucket quantity (B) so that a calculated error measure is substantially similar (or within an acceptable threshold range) of the target error value.

If at block 814, the comparator 706 determines that the calculated error measure does not exceed the target error value (or is within an acceptable threshold range of the target error value), the histogram interface 710 selects the histogram (block 818) represented by the bucket quantity (B), the bucket boundaries $(s_k, e_k)$, and the representative bucket values $(\hat{b})$. The data interface 702 stores the bucket quantity (B), the bucket boundaries $(s_k, e_k)$, and the representative bucket values $(\hat{b})$ (block 820) in a memory. Alternatively or additionally at block 818, the bucket quantity (B), the bucket boundaries $(s_k, e_k)$, and the representative bucket values $(\hat{b})$ could be displayed via a user interface display for visual analysis. The example process of FIG. 8 is then ended.

Turning now to FIG. 9, the illustrated example method can be used to implement the example apparatus 700 of FIG. 7 to select an optimal or near optimal quantity (C) of wavelet coefficients to represent and/or organize probabilistic data. Initially the data interface 702 (FIG. 7) receives input probabilistic data (block 902) (e.g., the probabilistic data 100 of FIGS. 1 and 5) and a target error value (block 904). For example, the data interface 702 may receive the probabilistic data and the target error value from a memory storage device. The wavelet interface 712 (FIG. 7) sets an initial coefficient quantity (C) (block 906) and selects a coefficient set associated with data items to be represented by each wavelet coefficient $(c_i)$ (block 908). The coefficient set can be selected by selecting a set of rows of a Haar wavelet matrix or a set of Haar vectors. In the illustrated examples described herein, the selected rows of the Haar wavelet matrix or the selected Haar vectors may or may not be contiguous or sequential.

The synopsis generator 708 (FIG. 7) determines a representative coefficient value $(\hat{c})$ (i.e., a synopsis) for each coefficient $(c_i)$ (block 910). For example, the synopsis generator 708 may determine the representative coefficient values $(\hat{c})$ using the techniques described above in connection with selecting an optimal or near optimal quantity (C) of wavelet coefficients. The error processor 704 (FIG. 7) determines an error measure (block 912) based on the coefficient quantity (C), the coefficient set, and the representative coefficient values $(\hat{c})$. In the illustrated example, the error measure is a probabilistic expected error such as the expected SSE error $(E_W[SSE(S_w(I))])$ or the expected point-error value $(E_W[err(g_i, v)])$ described above. The error processor 704 may determine the error measure as described above using on any of the cumulative error metrics SAE, SARE, SSE, or SSRE or maximum error metrics MAE or MARE. For example, if the probabilistic data includes instrument-based measurement values, a different one of the error metrics may be more suitable than if the probabilistic data included medical records or personnel records.

The comparator 706 (FIG. 7) determines whether the calculated error measure exceeds the target error value received at block 904 (block 914). If the calculated error measure exceeds the target error value (block 914), the wavelet interface 712 adjusts (e.g., increases) the coefficient quantity (C) (block 916) and control returns to block 908 so that a different coefficient set can be selected and the error measure can be re-calculated based on the updated quantity (C) of wavelet coefficients. In some example implementations, if the calculated error measure is too low (i.e., the calculated error measure is much less than the target error value), the wavelet interface 712 may decrease the coefficient quantity (C) so that a calculated error measure is substantially similar (or within an acceptable threshold range) of the target error value.

If at block 914 the comparator 706 determines that the calculated error measure does not exceed the target error value (block 914), the wavelet interface 712 selects the coefficient quantity (C) (block 918) (e.g., the coefficient quantity (C) set at block 906, or at block 916 if multiple iterations of the example process of FIG. 9 were performed for the input data). The data interface 702 stores the coefficient quantity (C), the coefficient set, and the representative coefficient values (ĉ) (block 920) in a memory. Alternatively or additionally at block 918, the coefficient quantity (C), the coefficient set, and the representative coefficient values (ĉ) could be displayed via a user interface display for visual analysis. The example process of FIG. 9 is then ended.

Turning now to FIG. 10, the illustrated example method can be used to output data values based on analyzing the histogram and/or wavelet structures generated using the example processes of FIGS. 8 and 9. Initially, the application interface 714 receives a data analysis request (block 1002). Based on the particular application with which the application interface 714 is communicating, the data analysis request may be a data records search request, a request to determine a relatively accurate measurement from a plurality of measurements having some degree of uncertainty, a request to discern communicated data, etc.

The application interface 714 then analyzes a histogram structure or a wavelet coefficient tree structure (block 1004). In the illustrated example, the application interface 704 analyzes a histogram structure generated using the example method of FIG. 8 or a wavelet coefficient tree structure generated using the example method of FIG. 9 as described above.

The output interface 716 then provides the results (block 1006) based on the analysis to a display or to another apparatus via, for example, a communication interface. The example method of FIG. 10 then ends.

Figure 11:
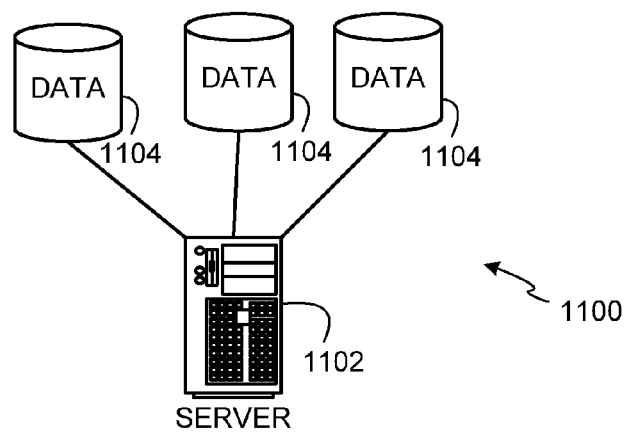
FIG. 11 illustrates an example distributed data system in which the example methods and apparatus described herein can be implemented to process probabilistic data.
Figure 12:
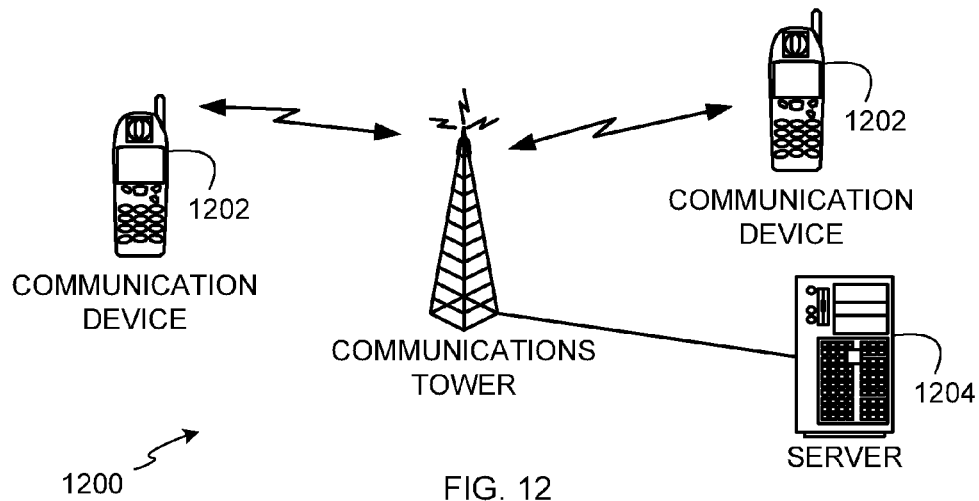
FIG. 12 illustrates an example communication system in which the example methods and apparatus described herein can be implemented to process probabilistic data.
Figure 13:
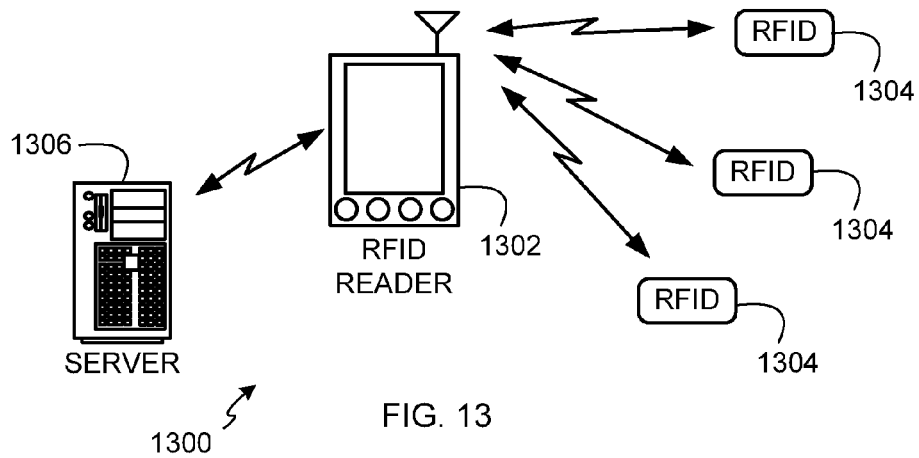
FIG. 13 illustrates an example radio frequency identification system in which the example methods and apparatus described herein can be implemented to process probabilistic data.

FIGS. 11-13 are example systems in which the example methods and apparatus described herein can be implemented to analyze and/or search probabilistic data. FIG. 11 illustrates a distributed data system 1100 in which a server 1102 is communicatively coupled to a plurality of data sources 1104. Probabilistic data may be created when information from different ones of the data sources 1104 is merged, thus, creating some uncertainty as to the accuracy of the merged data. For example, while the information stored in different ones of the data sources 1104 may be generally the same type of data, each of the data sources 1104 may store the information in accordance with differently labeled data fields or records. In some example implementations, the server 1102 may be an internet search engine server that searches information stored in different data sources and associated with some uncertainty based on how that information is tagged with categorical or categorical type identifiers. In any case, the server 1102 may be used to implement the example methods and apparatus to summarize or organize any probabilistic data to enable analyzing and/or search the data relatively more efficient, quicker, and with relatively more accuracy.

FIG. 12 is an example communications system 1200 in which data can be communicated between communication devices 1202 and/or a server 1204. For example, the communication devices 1202 may communicate data, voice, and/or audio between each other and/or may download and/or upload data, voice, and/or audio from/to the server 1204. The example methods and apparatus described herein may be implemented using the server 1204 (and/or other network elements of the communication system 1200) to analyze and more accurately identify information communicated via the communication system 1200. For example, the methods and apparatus described herein may be used to substantially minimize or eliminate instances of data loss when information is communicated and some communications packets may be subject to noise or may be dropped altogether, thus, creating uncertain or probabilistic data. The techniques described herein can be used to analyze and/or discern communications data with relatively more accuracy than would otherwise be possible when such uncertainties exist.

FIG. 13 is a radio frequency identification (RFID) system 1300 in which a RFID reader 1302 (i.e., a data acquisition system) reads identification and/or other information from a plurality of RFID tags 1304. In the illustrated example, the RFID tags 1304 may be attached to different items of interest for, for example, tracking purposes, inventory purposes, etc. Uncertain or probabilistic data may arise in the RFID system 1300 as a result of the RFID reader 1302 encountering RF-noisy environments or other situations causing the RFID information read by the RFID reader 1302 to become inaccurate or otherwise uncertain. In the illustrated example, the RFID reader 1302 may be configured to implement the example methods and apparatus described herein to organize and analyze the RFID information. Alternatively or additionally, the RFID reader 1302 may communicate the RFID information to a server 1306 and the server 1306 may implement the example methods and apparatus described herein to organize and analyze the RFID information. Although RFID tags are shown in FIG. 13, the example methods and apparatus can be implemented in connection with information from any other type of wireless communication tag or optical-based tag.

Of course, the example systems of FIGS. 11-13 are only some examples of systems in which the example methods and apparatus described herein can be employed. The example methods and apparatus described herein can be additionally or alternatively employed in other example systems and applications.

FIG. 14 is a block diagram of an example processor system 1410 that may be used to implement the example apparatus, methods, and articles of manufacture described herein. For example, processor systems substantially similar or identical to the example processor system 1410 may be used to implement the data interface 702, the error processor 704, the comparator 706, the synopsis generator 708, the histogram interface 710, the wavelet interface 712, the application interface 714, and/or the output interface 716 of the example apparatus 700 of FIG. 7.

As shown in FIG. 14, the processor system 1410 includes a processor 1412 that is coupled to an interconnection bus 1414. The processor 1412 may be any suitable processor, processing unit, or microprocessor. Although not shown in FIG. 14, the system 1410 may be a multi-processor system and, thus, may include one or more additional processors that are identical or similar to the processor 1412 and that are communicatively coupled to the interconnection bus 1414.

The processor 1412 of FIG. 14 is coupled to a chipset 1418, which includes a memory controller 1420 and an input/output (I/O) controller 1422. A chipset provides I/O and memory management functions as well as a plurality of general purpose and/or special purpose registers, timers, etc. that are accessible or used by one or more processors coupled to the chipset 1418. The memory controller 1420 performs functions that enable the processor 1412 (or processors if there are multiple processors) to access a system memory 1424 and a mass storage memory 1425.

In general, the system memory 1424 may include any desired type of volatile and/or non-volatile memory such as, for example, static random access memory (SRAM), dynamic random access memory (DRAM), flash memory, read-only memory (ROM), etc. The mass storage memory 1425 may include any desired type of mass storage device including hard disk drives, optical drives, tape storage devices, etc.

The system memory 1424 may include any desired type of volatile and/or non-volatile memory such as, for example, static random access memory (SRAM), dynamic random access memory (DRAM), flash memory, read-only memory (ROM), etc. The mass storage memory 1425 may include any desired type of mass storage device including hard disk drives, optical drives, tape storage devices, etc.

The I/O controller 1422 performs functions that enable the processor 1412 to communicate with peripheral input/output (I/O) devices 1426 and 1428 and a network interface 1430 via an I/O bus 1432. The I/O devices 1426 and 1428 may be any desired type of I/O device such as, for example, a keyboard, a video display or monitor, a mouse, etc. The network interface 1430 may be, for example, an Ethernet device, an asynchronous transfer mode (ATM) device, an 802.11 device, a digital subscriber line (DSL) modem, a cable modem, a cellular modem, etc. that enables the processor system 1410 to communicate with another processor system.

While the memory controller 1420 and the I/O controller 1422 are depicted in FIG. 14 as separate functional blocks within the chipset 1418, the functions performed by these blocks may be integrated within a single semiconductor circuit or may be implemented using two or more separate integrated circuits.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above-described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are stored on a tangible medium, such as: a magnetic medium (e.g., a disk or tape); a magneto-optical or optical medium such as a disk; or a solid state medium such as a memory card or other package that houses one or more read-only (non-volatile) memories, random access memories, or other re-writeable (volatile) memories. Accordingly, the example software and/or firmware described herein can be stored on a tangible medium such as those described above or equivalents and successor media.

To the extent the above specification describes example components and functions with reference to particular devices, standards and/or protocols, it is understood that the teachings of the invention are not limited to such devices, standards and/or protocols. Such devices are periodically superseded by different, faster, and/or more efficient systems having the same general purpose. Accordingly, replacement devices, standards and/or protocols having the same general functions are equivalents which are intended to be included within the scope of the accompanying claims.

Further, although certain methods, apparatus, systems, and articles of manufacture have been described herein, the scope of coverage of this patent is not limited thereto. To the contrary, this patent covers all methods, apparatus, systems, and articles of manufacture fairly falling within the scope of the appended claims either literally or under the doctrine of equivalents.

What is claimed is:

1. A method of selecting wavelet coefficients to represent probabilistic data, comprising:

generating an initial wavelet coefficient quantity exceeding a target error value;

iteratively generating different wavelet coefficient quantities until an error measure of a selected one of the different wavelet coefficient quantities is less than or equal to the target error value, the different wavelet coefficient quantities generated based on items represented by probabilistic data having uncertainties as to information of a data transmission that the probabilistic data represents, and each wavelet coefficient quantity representing a different combination of the items;

for the different wavelet coefficient quantities, determining the error measure by determining one corresponding probabilistic expected error for each of the coefficients of the different wavelet coefficient quantities, the probabilistic expected error indicative of an accuracy with which a synopsis represents items associated with a corresponding one of the coefficients;

selecting the selected one of the different wavelet coefficient quantities based on its associated error measure; and displaying parameter information associated with the selected wavelet coefficient quantity to represent the probabilistic data, the parameter information to reduce data loss associated with at least one of noisy data transmissions or dropped data transmissions.

2. A method as defined in claim 1, further comprising determining the error measure using at least one of a cumulative error metric or a maximum error metric.

3. A method as defined in claim 1, further comprising determining a plurality of representative wavelet coefficient values, the representative wavelet coefficient values corresponding to respective ones of the plurality of wavelet coefficient quantities.

4. A method as defined in claim 3, wherein determining the plurality of representative wavelet coefficient values comprises selecting the plurality of representative wavelet coefficient values from a Haar wavelet matrix to minimize a corresponding error measure between wavelet vectors of the representative wavelet coefficient values and the probabilistic data.

5. A method as defined in claim 1, further comprising generating a first one of the plurality of wavelet coefficient quantities by selecting first coefficients associated with the first one of the plurality of wavelet coefficient quantities, and generating a second one of the plurality of wavelet coefficient quantities by selecting second coefficients associated with the second one of the plurality of wavelet coefficient quantities, wherein at least some of the first coefficients are different than at least some of the second coefficients.

6. A method as defined in claim 1, wherein the probabilistic data is generated by communicating information via a communication network.

7. A method as defined in claim 1, wherein the probabilistic data is representative of radio frequency identification data.

8. A method as defined in claim 1, wherein the probabilistic data is representative of audio information communicated via a communication network.

9. An apparatus to select wavelet coefficients to represent probabilistic data, comprising:
  a processor; and
  a memory storing machine readable instructions that, when executed by the processor, cause the processor to perform operations comprising:
  generating a wavelet coefficient quantity exceeding a target error value;
  iteratively generating different wavelet coefficient quantities until an error measure of a selected one of the different wavelet coefficient quantities is less than or equal to the target error value, the different wavelet coefficient quantities generated based on items represented by probabilistic data having uncertainties as to information of a data transmission that the probabilistic data represents, and each wavelet coefficient quantity representing a different combination of the items;
  for the different wavelet coefficient quantities, determining the error measure by determining one corresponding probabilistic expected error for each of the coefficients of the different wavelet coefficient quantities, the probabilistic expected error indicative of an accuracy with which a synopsis represents items associated with a corresponding one of the coefficients;
  selecting the selected one of the different wavelet coefficient quantities based on its associated error measure; and
  displaying parameter information associated with the selected wavelet coefficient quantity to represent the probabilistic data, the parameter information to reduce data loss associated with at least one of noisy data transmissions or dropped data transmissions.

10. An apparatus as defined in claim 9, wherein the operations further comprise determining the error measure using at least one of a cumulative error metric or a maximum error metric.

11. An apparatus as defined in claim 9, wherein the operations further comprise determining a plurality of representative wavelet coefficient values, the representative wavelet coefficient values corresponding to respective ones of the plurality of wavelet coefficient quantities.

12. An apparatus as defined in claim 11, wherein determining the plurality of representative wavelet coefficient values comprises selecting the plurality of representative wavelet coefficient values from a Haar wavelet matrix to minimize a corresponding error measure between wavelet vectors of the representative wavelet coefficient values and the probabilistic data.

13. An apparatus as defined in claim 9, wherein the operations further comprise generating a first one of the plurality of wavelet coefficient quantities by selecting first coefficients associated with the first one of the plurality of wavelet coefficient quantities, and generating a second one of the plurality of wavelet coefficient quantities by selecting second coefficients associated with the second one of the plurality of wavelet coefficient quantities, wherein at least some of the first coefficients are different than at least some of the second coefficients.

14. An apparatus as defined in claim 9, wherein the probabilistic data is generated by reading information from a radio frequency identification tag.

15. An apparatus as defined in claim 9, wherein the probabilistic data is representative of audio information communicated via a communication network.

16. An optical disk comprising instructions which, when executed, cause a machine to perform a method, comprising:
  generating a wavelet coefficient quantity exceeding a target error value;
  iteratively generating different wavelet coefficient quantities until an error measure of a selected one of the different wavelet coefficient quantities is less than or equal to the target error value, the different wavelet coefficient quantities generated based on items represented by probabilistic data having uncertainties as to information of a data transmission that the probabilistic data represents, and each wavelet coefficient quantity representing a different combination of the items;
  for the different wavelet coefficient quantities, determining the error measure by determining one corresponding probabilistic expected error for each of the coefficients of the different wavelet coefficient quantities, the probabilistic expected error indicative of an accuracy with which a synopsis represents items associated with a corresponding one of the coefficients;
  selecting the selected one of the different wavelet coefficient quantities based on its associated error measure; and
  displaying parameter information associated with the selected wavelet coefficient quantity to represent the probabilistic data, the parameter information to reduce data loss associated with at least one of noisy data transmissions or dropped data transmissions.

17. An optical disk as defined in claim 16, wherein the method further comprises determining the error measure using at least one of a cumulative error metric or a maximum error metric.

18. An optical disk as defined in claim 16, wherein the method further comprises determining a plurality of representative wavelet coefficient values, the representative wavelet coefficient values corresponding to respective ones of the plurality of wavelet coefficient quantities.

19. An optical disk as defined in claim 18, wherein determining the plurality of representative wavelet coefficient values comprises selecting the plurality of representative wavelet coefficient values from a Haar wavelet matrix to minimize a corresponding error measure between wavelet vectors of the representative wavelet coefficient values and the probabilistic data.

20. An optical disk as defined in claim 16, wherein the method further comprises generating a first one of the plurality of wavelet coefficient quantities by selecting first coefficients associated with the first one of the plurality of wavelet coefficient quantities, and generating a second one of the plurality of wavelet coefficient quantities by selecting second coefficients associated with the second one of the plurality of wavelet coefficient quantities, wherein at least some of the first coefficients are different than at least some of the second coefficients.

* * * * *